(12) United States Patent
Sengoku et al.

(10) Patent No.: US 8,970,248 B2
(45) Date of Patent: Mar. 3, 2015

(54) SHARING HARDWARE RESOURCES BETWEEN D-PHY AND N-FACTORIAL TERMINATION NETWORKS

(71) Applicant: QUALCOMM Incorporated, San Diego, CA (US)

(72) Inventors: Shoichiro Sengoku, San Diego, CA (US); George Alan Wiley, San Diego, CA (US); Chulkyu Lee, San Diego, CA (US); Joseph Cheung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/210,246

(22) Filed: Mar. 13, 2014

(65) Prior Publication Data

US 2014/0270005 A1    Sep. 18, 2014

Related U.S. Application Data

(60) Provisional application No. 61/787,622, filed on Mar. 15, 2013.

(51) Int. Cl.
  *H03K 17/16* (2006.01)
  *H04L 27/20* (2006.01)
  *G06F 13/40* (2006.01)
  (Continued)

(52) U.S. Cl.
  CPC ........ *H04L 27/2071* (2013.01); *G06F 13/4063* (2013.01); *G08C 19/00* (2013.01); *H04B 1/06* (2013.01); *H04B 3/00* (2013.01); *H04L 25/0272* (2013.01); *H04L 25/0292* (2013.01); *H04L 69/18* (2013.01)

USPC .................. 326/21; 326/26; 326/30; 326/38; 326/82

(58) Field of Classification Search
  USPC ............................. 326/21, 26, 27, 30, 38, 82
  See application file for complete search history.

(56) References Cited

U.S. PATENT DOCUMENTS

| | | | |
|---|---|---|---|
| 6,556,628 B1 | 4/2003 | Poulton et al. | |
| 6,683,472 B2 * | 1/2004 | Best et al. | 326/30 |
| 7,391,231 B2 * | 6/2008 | Gomez et al. | 326/30 |
| 7,899,948 B2 | 3/2011 | Olschner et al. | |
| 7,940,086 B2 * | 5/2011 | Suenaga et al. | 326/86 |
| 2002/0003435 A1 * | 1/2002 | Andrews et al. | 326/39 |
| 2010/0066404 A1 * | 3/2010 | Zhang et al. | 326/30 |

(Continued)

FOREIGN PATENT DOCUMENTS

WO    WO-2008065515 A2    6/2008

OTHER PUBLICATIONS

International Search Report and Written Opinion—PCT/US2014/028625—ISA/EPO—May 22, 2014.

*Primary Examiner* — Don Le
(74) *Attorney, Agent, or Firm* — Loza & Loza, LLP

(57) ABSTRACT

A termination network for a receiver device is provided to support both D-PHY signaling and N-factorial signaling. The first end of each of a plurality dynamically configurable switches is coupled to a common node. A first end of each of a plurality of resistances is coupled to a second end of a corresponding switch. A plurality of terminals receive differential signals and each terminal is coupled to a corresponding second end of a resistance. Each of a plurality differential receivers is coupled between two terminals of the termination network, wherein a first differential receiver and a second differential receiver are coupled to the same two terminals, the first differential receiver is used when the differential signals use a first type of differential signal encoding, the second differential receiver is used when the differential signals use a second type of differential signal encoding.

26 Claims, 27 Drawing Sheets

(51) Int. Cl.
*G08C 19/00* (2006.01)
*H04B 1/06* (2006.01)
*H04B 3/00* (2006.01)
*H04L 25/02* (2006.01)
*H04L 29/06* (2006.01)

(56) References Cited

U.S. PATENT DOCUMENTS

2010/0231285 A1 9/2010 Boomer et al.
2012/0265911 A1 10/2012 Connolly et al.

* cited by examiner

FIG. 1  D-PHY Differential Signaling System

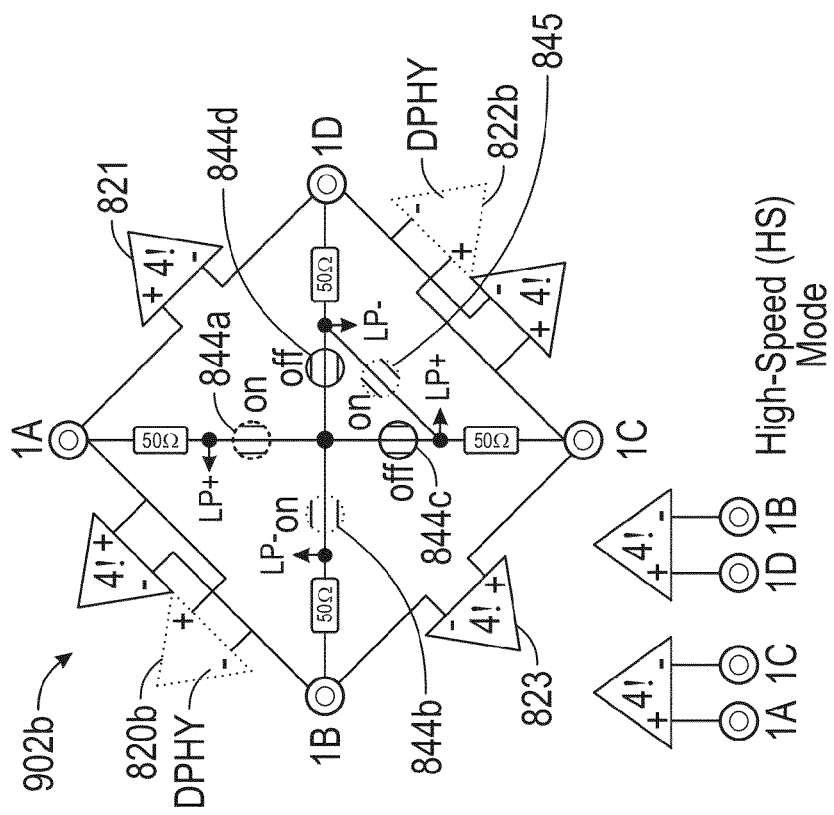
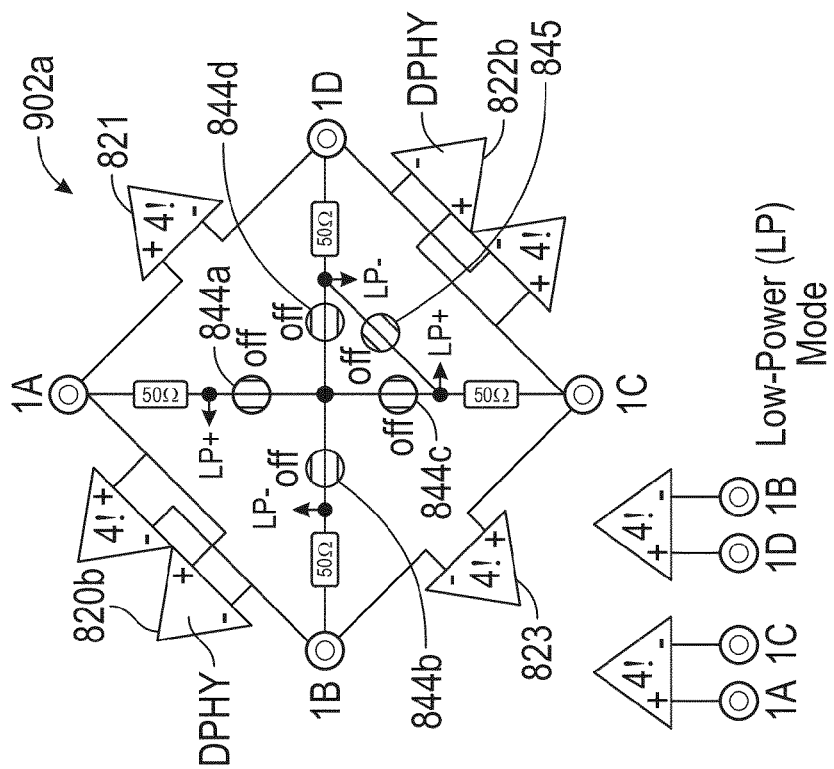
FIG. 9

SHARING HARDWARE RESOURCES BETWEEN D-PHY AND N-FACTORIAL TERMINATION NETWORKS

CLAIM OF PRIORITY UNDER 35 U.S.C. §119

The present Application for Patent claims priority to U.S. Provisional Applications No. 61/787,622 entitled "Sharing Hardware Resources Between D-PHY And N-Factorial Termination Networks", filed Mar. 15, 2013, assigned to the assignee hereof and hereby expressly incorporated by reference herein.

FIELD

The present disclosure pertains to reusing termination networks/circuits used for different types of multi-wire differential signaling data transfers.

BACKGROUND

In multi-signal data transfer, differential signaling is sometimes used to transmit information by sending complementary signals on two paired wires/conductors, where the information is conveyed by the difference between the paired wires/conductors. For example, the Mobile Industry Processor Interface (MIPI®) Alliance has defined a D-PHY Specification as a flexible, low-cost, High-Speed serial interface solution for communication interconnection between components inside a mobile device.

However, as more efficient ways of transmitting differential signals over the same or fewer number conductors are developed, it would be advantageous to be able to support both legacy differential signaling standards and newer differential signaling techniques.

Therefore, an efficient receiver/transmitter termination network/circuit is needed that support both legacy differential signaling standards and newer differential signaling techniques reusing hardware resources in order to minimize the size of such receiver circuit.

SUMMARY

A termination network for a receiver device is provided. The termination network includes a plurality dynamically configurable switches, a first end of each switch coupled to a common node. Additionally, a plurality of resistances may have a first end of each resistance coupled to a second end of a corresponding switch. The termination network may also include a plurality of terminals, where each terminal is coupled to a corresponding second end of a resistance. A plurality differential receivers may have each receiver coupled between two terminals of the plurality of terminals, wherein a first subset of differential receivers are used for a first type of differential signal encoding and a second subset of differential receivers are used for a second type of differential signal encoding, and at least a first differential receiver is shared by both the first and second sets of differential receivers.

One or more of the switches are turned off or on depending on whether the first subset of differential receivers is used or the second set of differential receivers is used. In one example, the first differential receiver is used for D-PHY differential signaling and for N-factorial differential signaling. In another example, the termination network for a receiver device of claim 3, wherein the N-factorial differential signaling is 4-factorial differential signaling. The N-factorial differential signaling is 3-factorial differential signaling. When using D-PHY differential signaling, the termination network may be configured for D-PHY low-power (LP) single ended signaling mode operation in which all of the switches are turned off and the outputs LP+ and LP− are taken at the first ends of the resistances. When using D-PHY differential signaling, the termination network may be configured for D-PHY low-power (LP) single ended signaling mode operation in which all of the switches are turned off and the outputs LP+ and LP− are taken at the plurality of terminals.

When using D-PHY differential signaling, the termination network may be configured for D-PHY high-speed (HS) differential signaling mode operation in which two of the switches are turned on, a bridging switch between the first ends of two resistances is turned on, and the outputs are taken at a subset of the plurality differential receivers. When using N-factorial differential signaling the termination network may be configured for N-factorial low-power (LP) single ended signaling mode operation in which all of the switches are turned off and the outputs LP+ and LP− are taken at the first ends of the resistances. When using N-factorial differential signaling the termination network may be configured for N-factorial low-power (LP) single ended signaling mode operation in which all of the switches are turned off and the outputs LP+ and LP− are taken at the plurality of terminals. When using N-factorial differential signaling the termination network may be configured for N-factorial high-speed (HS) differential signaling mode operation in which all of the switches are turned on, a bridging switch between the first ends of two resistances is turned off, and the outputs are taken at the plurality differential receivers. At least two of the plurality of differential receivers may be shared when using N-factorial differential signaling and D-PHY differential signaling.

A method for sharing a termination network for different types of differential signals used by a device is also provided. Whether the device is to operate according to a first type of differential signal encoding or a second type of differential signal encoding is ascertained. A plurality differential receivers may be dynamically configured depending on the type of differential signal encoding used by the device, wherein a first subset of differential receivers are used for a first type of differential signal encoding and a second subset of differential receivers are used for a second type of differential signal encoding, and at least one differential receiver is shared by both the first and second sets of differential receivers. The first and second sets of differential receivers share at least a plurality of terminals through which differential signals are received.

The first subset of differential receivers may be used for D-PHY differential signaling and the second subset of differential receivers is used for N-factorial differential signaling. In one example, the N-factorial differential signaling may be 4-factorial differential signaling. In another example, the N-factorial differential signaling may be 3-factorial differential signaling. When using N-factorial differential signaling the termination network may be configured for N-factorial low-power (LP) single ended signaling mode operation. When using N-factorial differential signaling the termination network may be configured for N-factorial high-speed (HS) differential signaling mode operation.

DRAWINGS

Various features, nature and advantages may become apparent from the detailed description set forth below when FIG. 1 illustrates a D-PHY differential signaling system.

FIG. 2 further illustrates the components of a D-PHY receiver system.

FIG. 9 illustrates how the first combined receiver circuit of FIG. 8 may be configured for D-PHY low-power (LP) (single ended signaling) mode operation as well as for D-PHY high-speed (HS) (differential signaling) mode operation.

Figure 11:
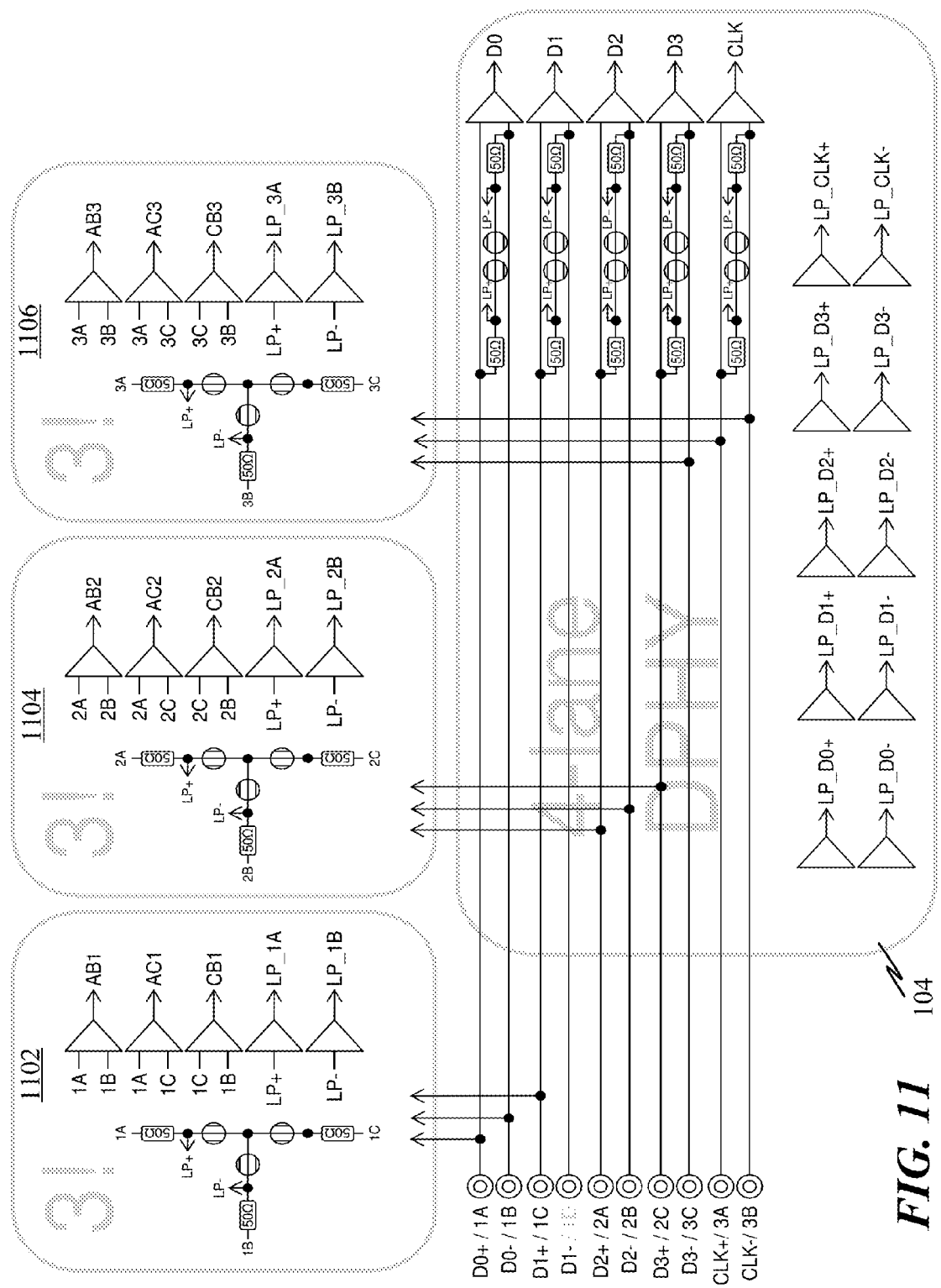
FIG. 11 illustrates the components of the 4-lane D-PHY receiver and 3-factorial differential signaling receiver circuits.
Figure 12:
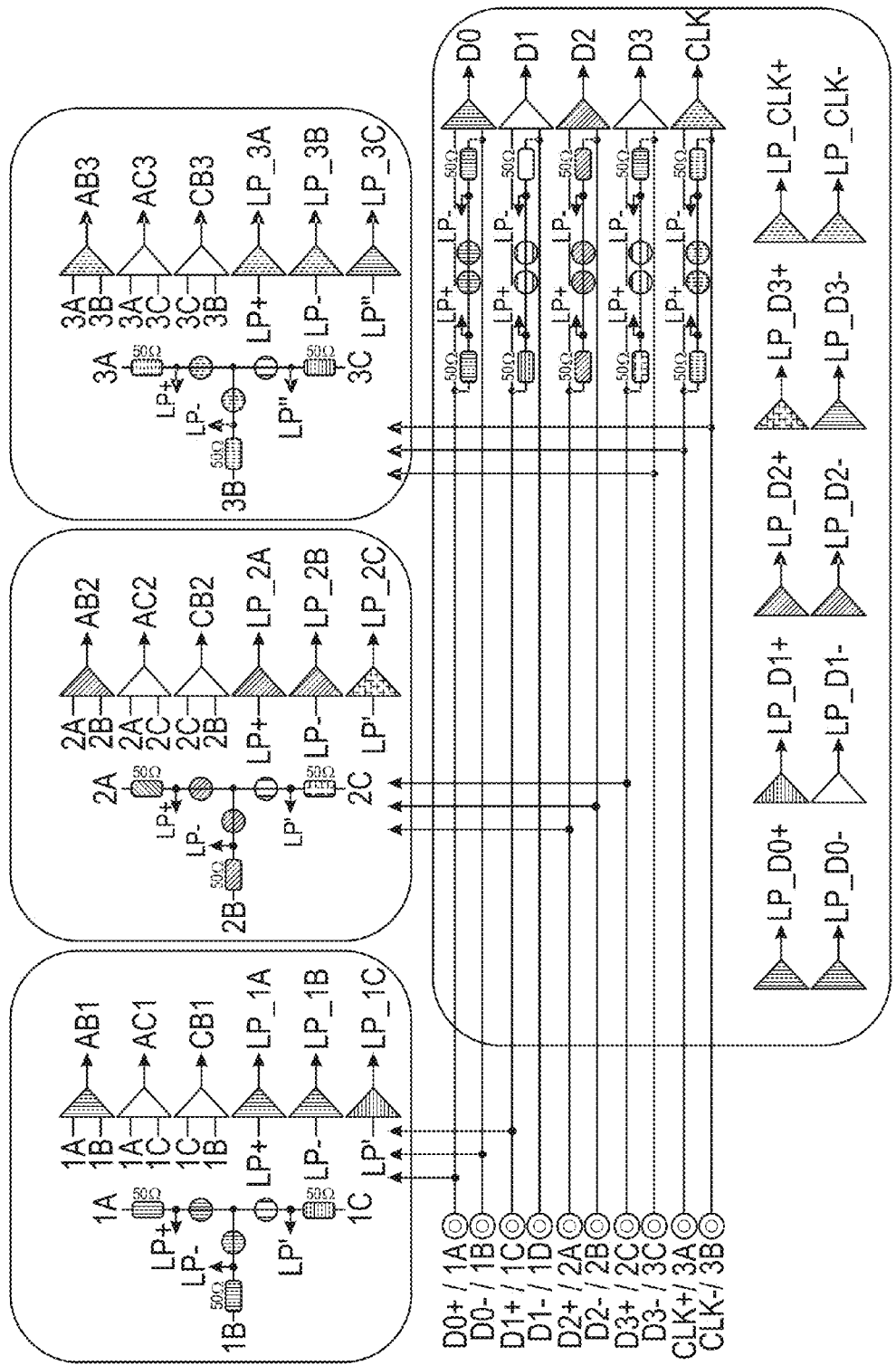

FIG. 12 illustrates the shareable portions of the 4-lane D-PHY receiver 104 and the 3-factorial differential signaling receiver circuits of FIG. 11.

Figure 13:
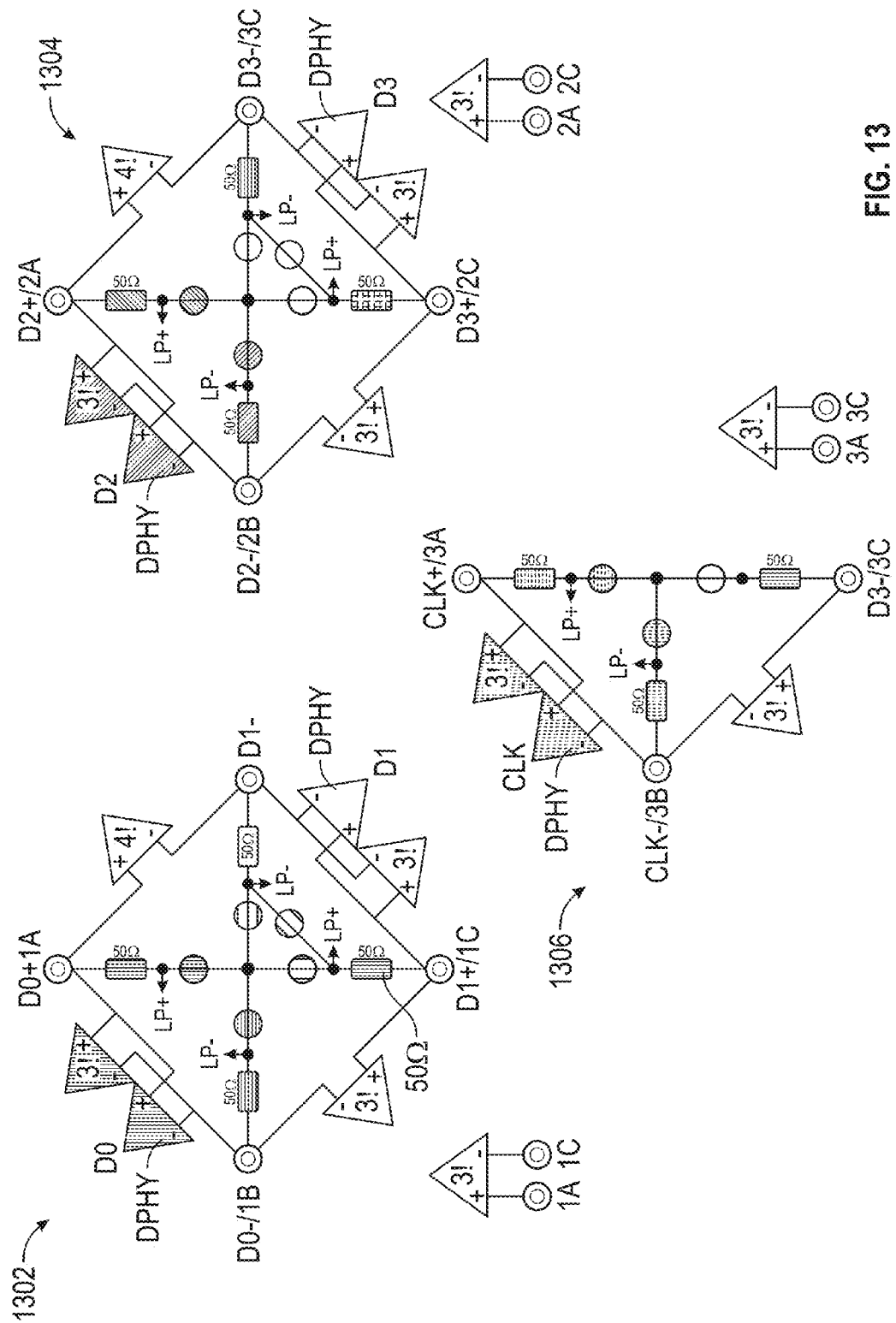

FIG. 13 illustrates how the 4-lane D-PHY receiver and the 3-factorial differential signaling receiver circuits in FIG. 12 may be combined into a first, second, and third combined receiver circuits.

Figure 14:
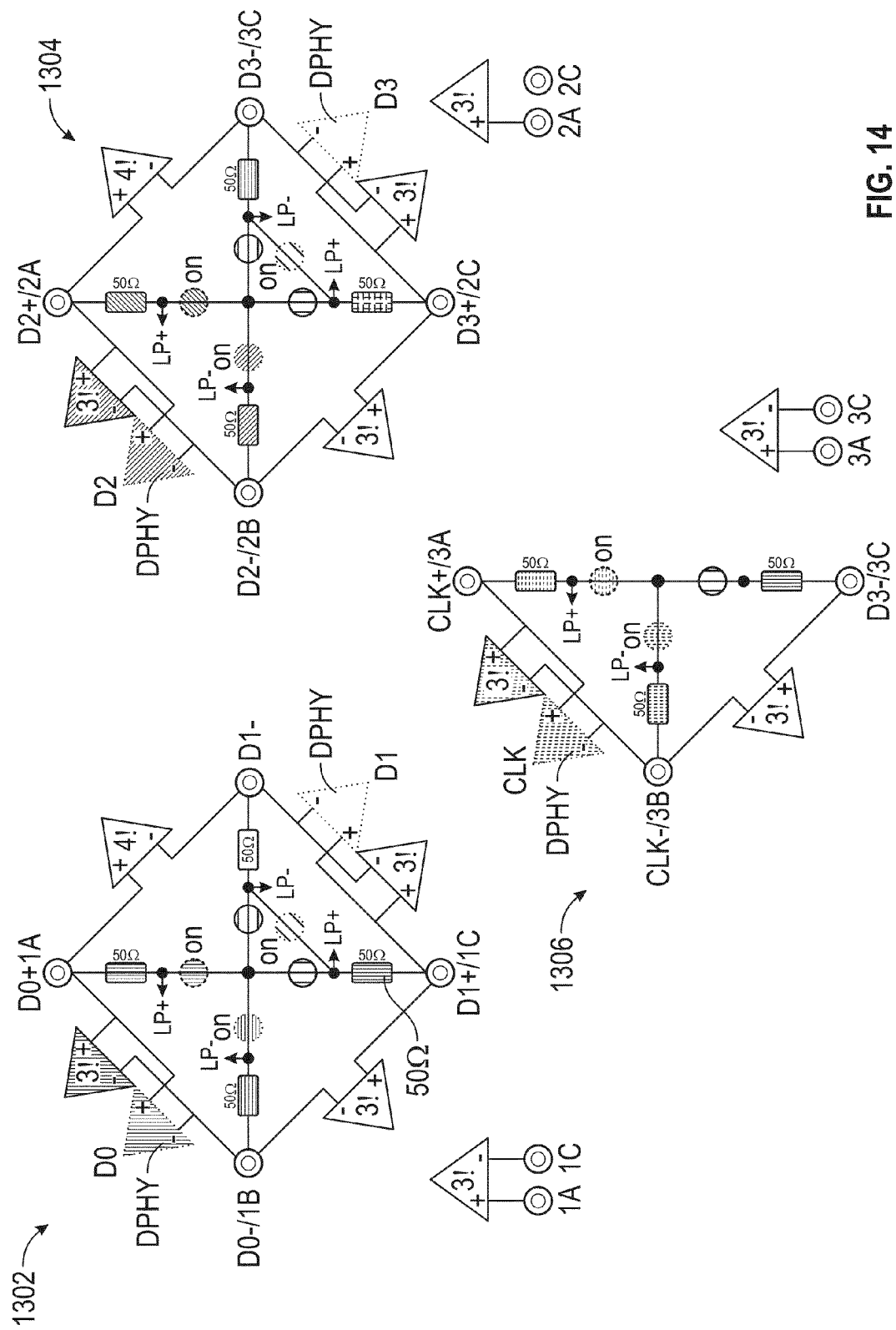

FIG. 14 illustrates how the first combined receiver circuit, second combined receiver circuit and third combined receiver circuit of FIG. 13 may be configured for D-PHY mode operation.

Figure 15:
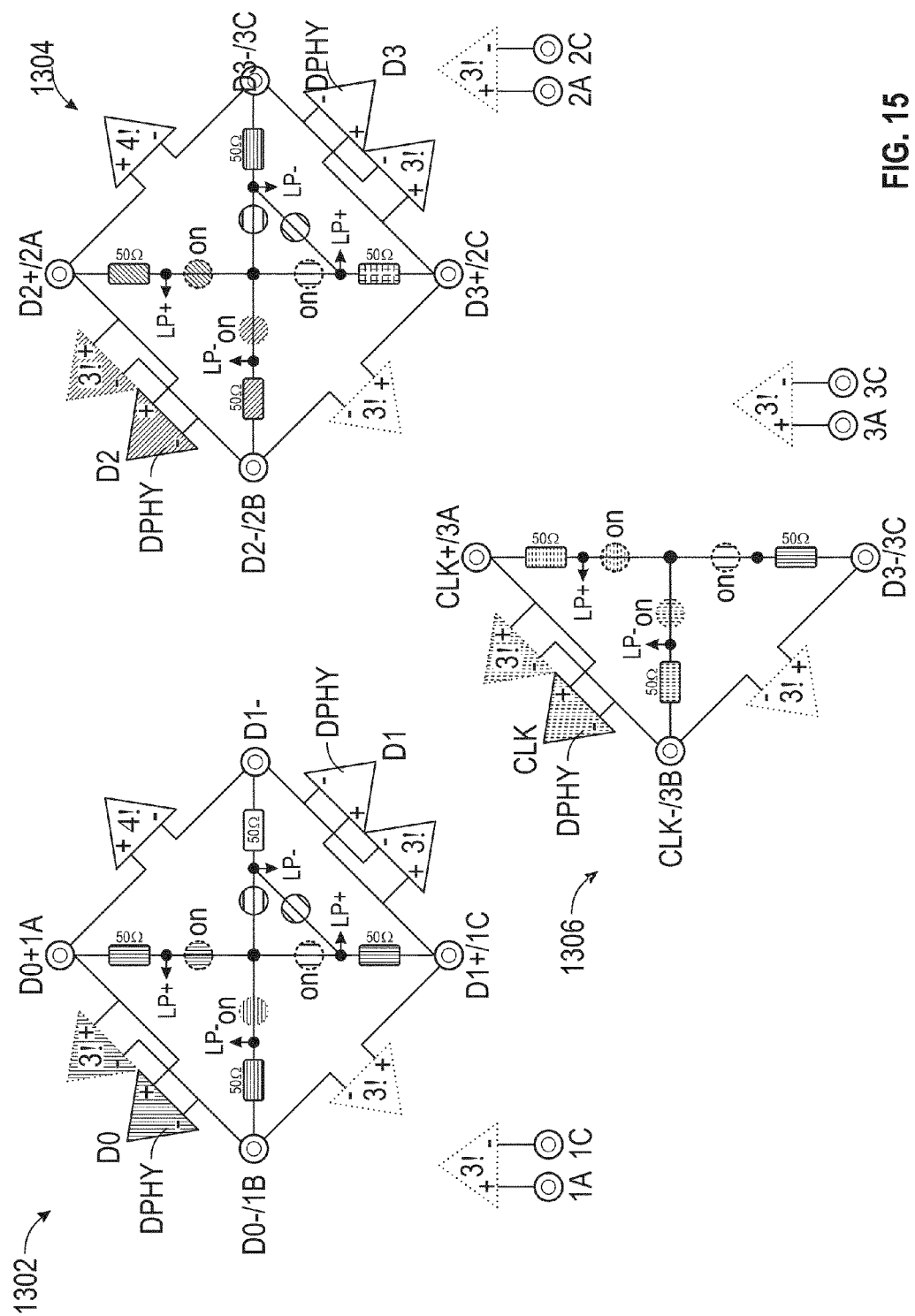

FIG. 15 illustrates how the first, second, and third combined receiver circuits may be configured for 3-factorial mode operation.

Figure 16:
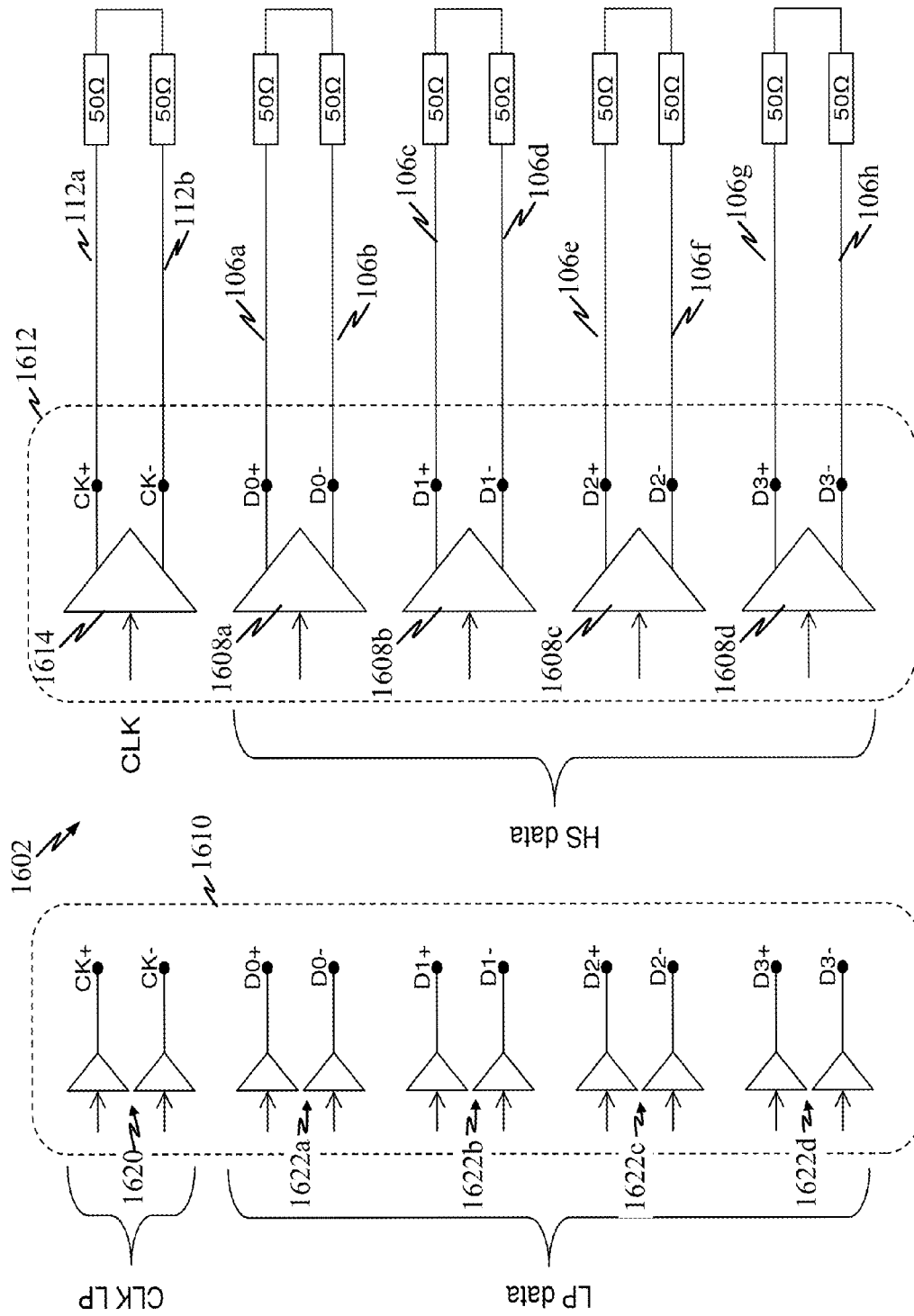

FIG. 16 further illustrates components of a D-PHY transmitter system.

Figure 17:
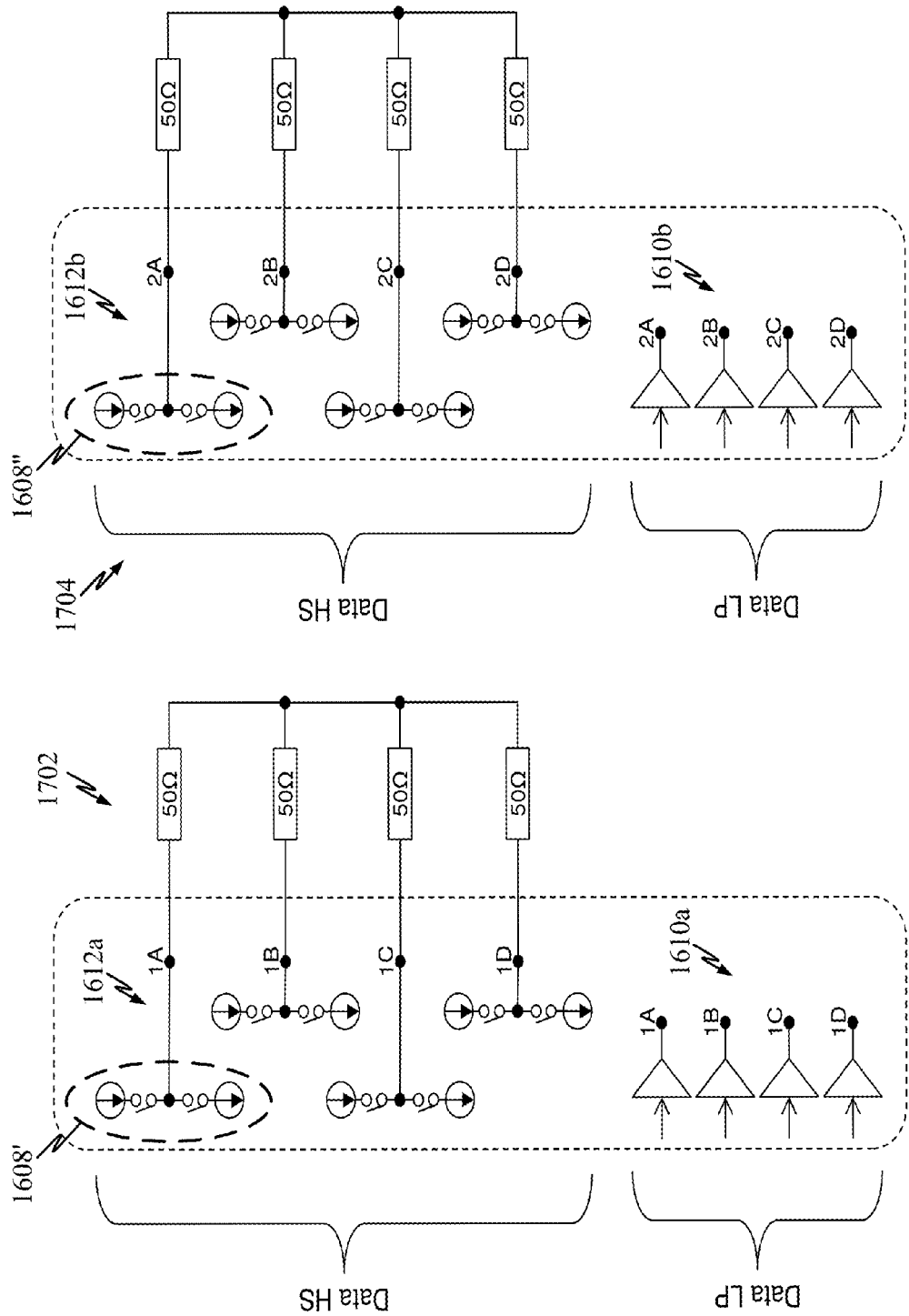

FIG. 17 illustrates an exemplary driver circuit (or termination network) for a 4-factorial differential signaling system.

Figure 18:
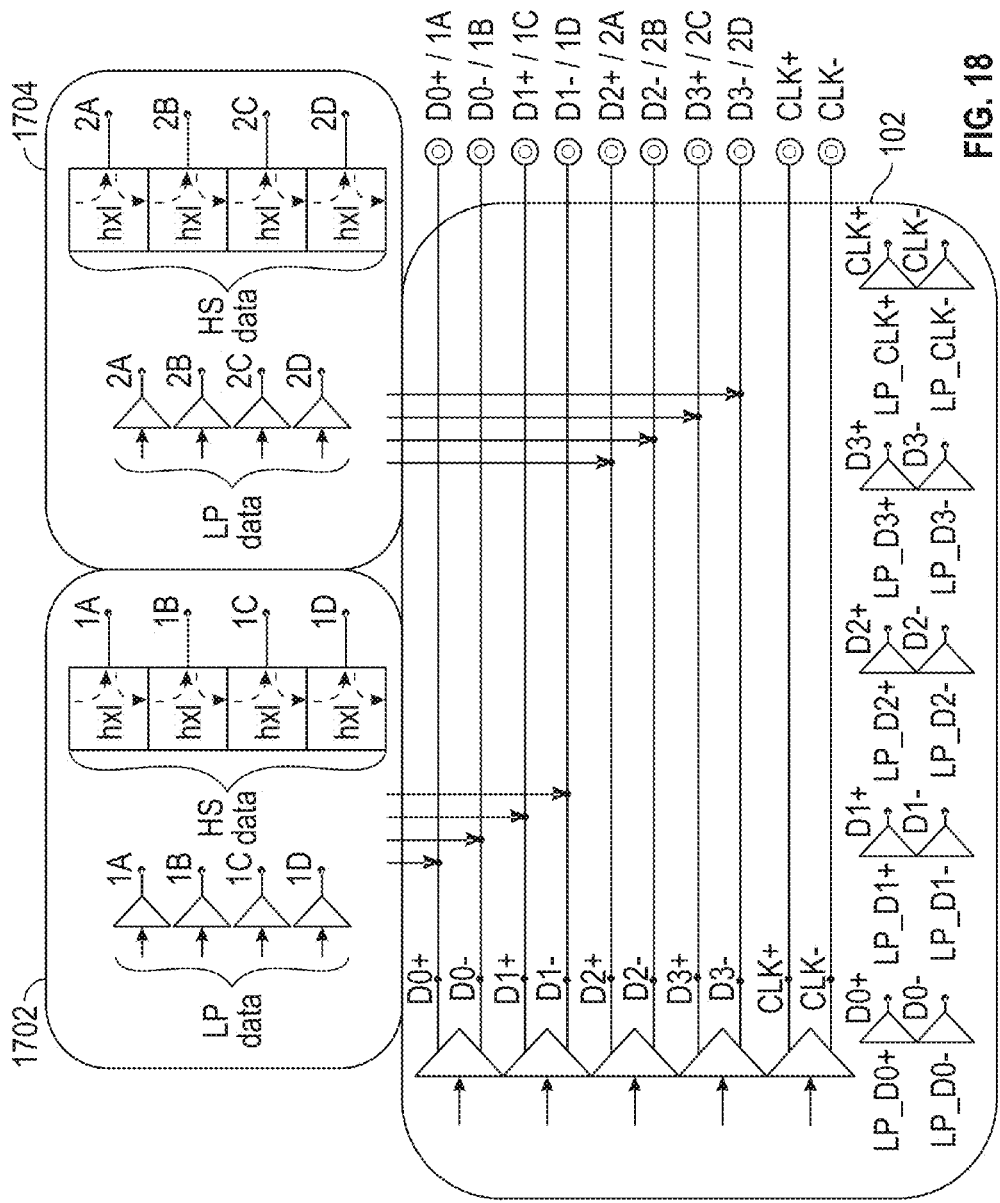

FIG. 18 illustrates the components of the 4-lane D-PHY transmitter and the 4-factorial differential signaling driver circuits (or termination network).

Figure 19:
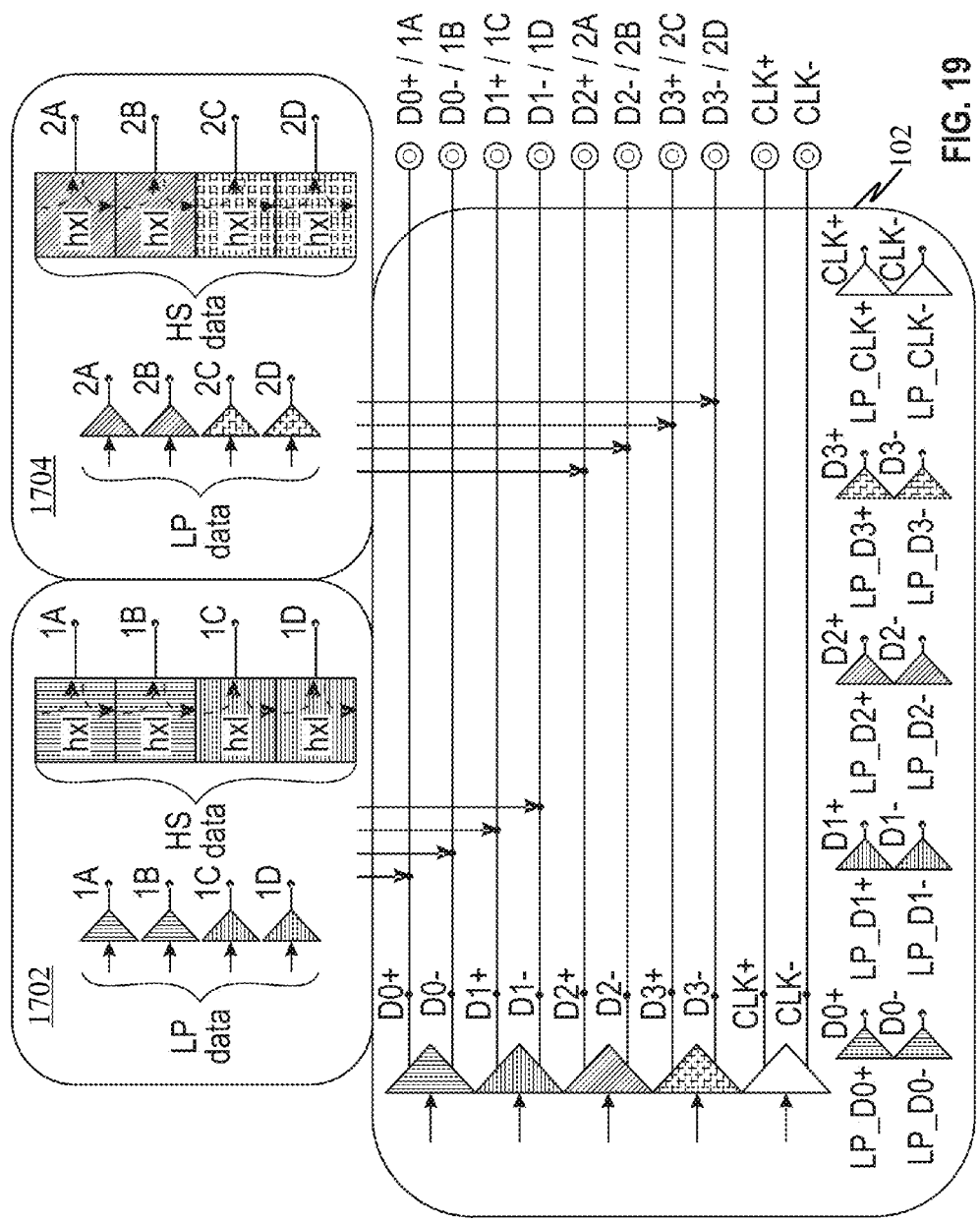

FIG. 19 illustrates shareable portions of the 4-lane D-PHY transmitter (FIG. 1) and 4-factorial differential signaling driver circuits of FIG. 18.

Figure 20:
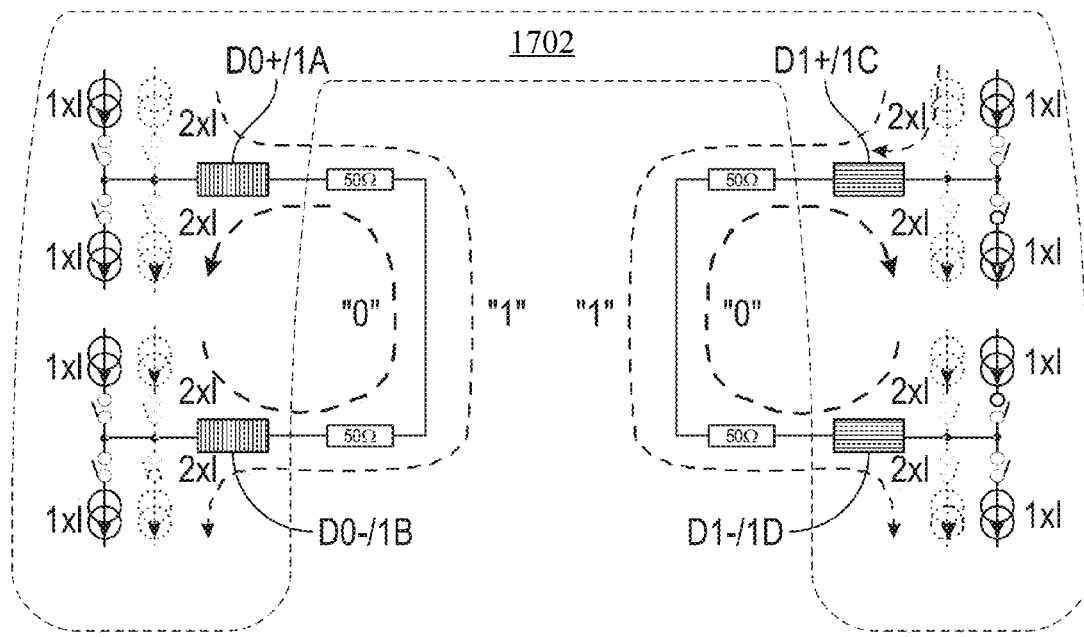
Figure 21:
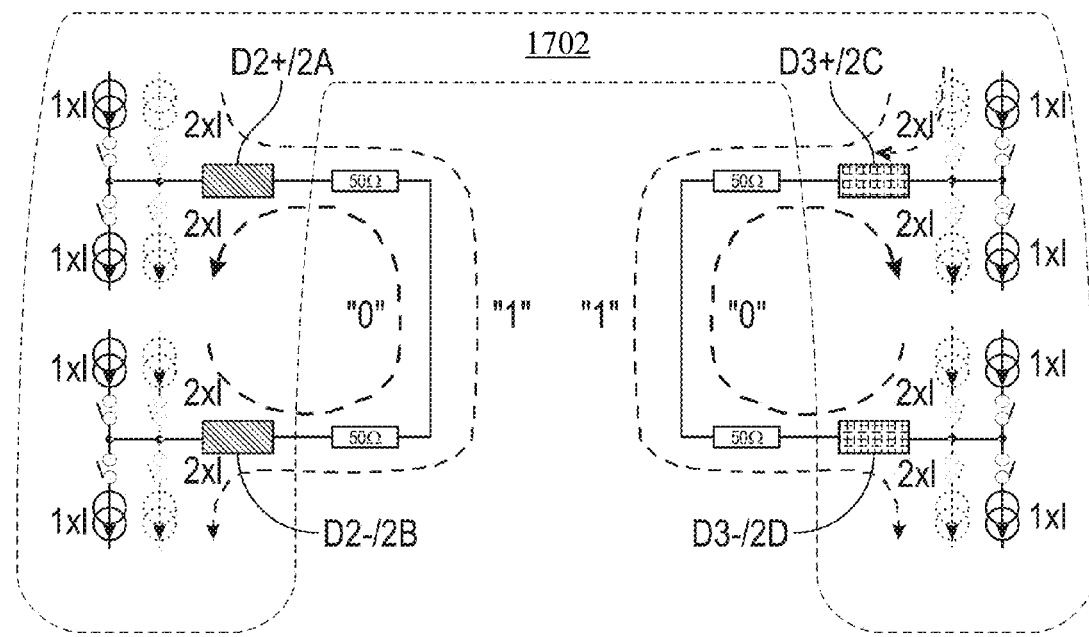

FIGS. 20 and 21 illustrate how combined driver circuits (from FIG. 19) may be configured for D-PHY mode operation.

Figure 22:
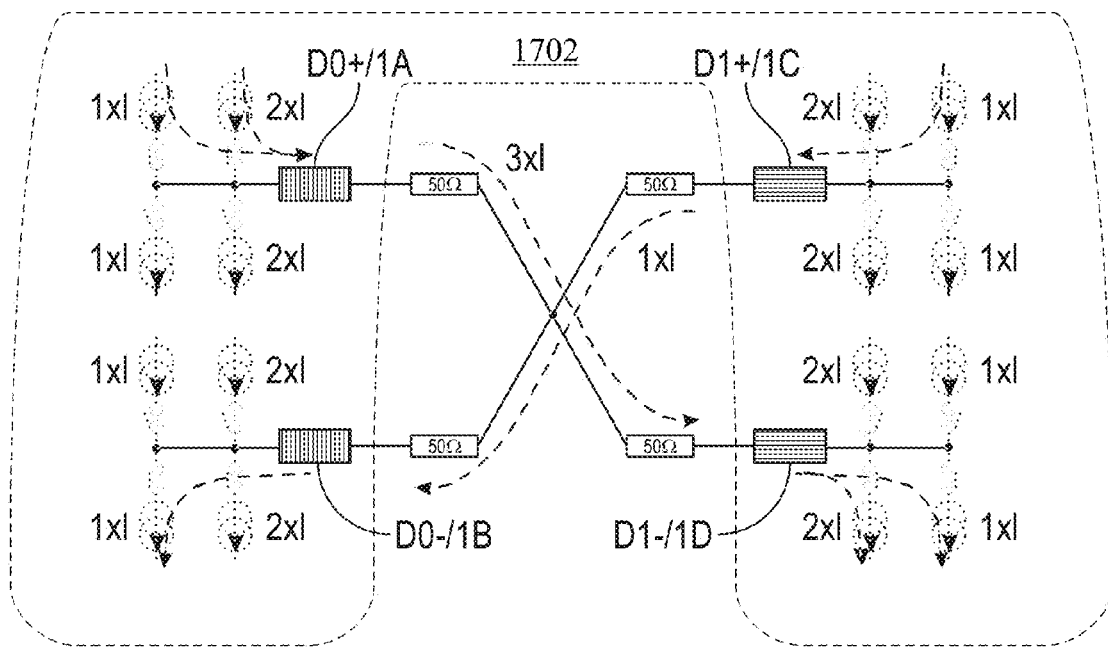
Figure 23:
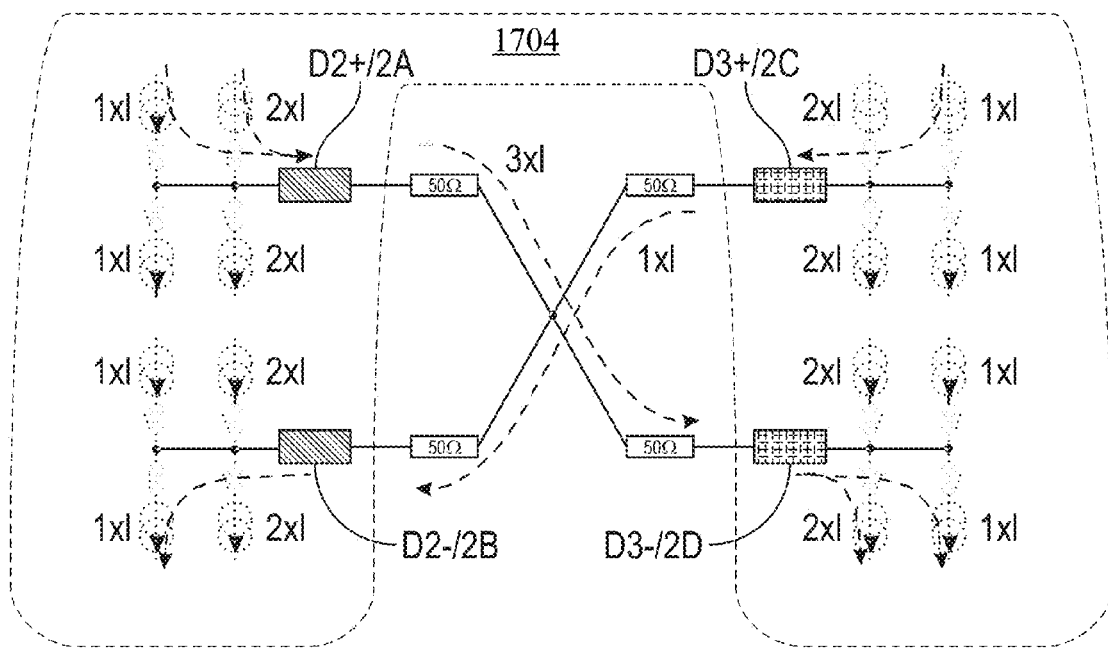

FIGS. 22 and 23 illustrate how a first combined driver circuit and second combined driver circuit (from FIG. 19) may be configured for 4-factorial mode operation.

Figure 24:
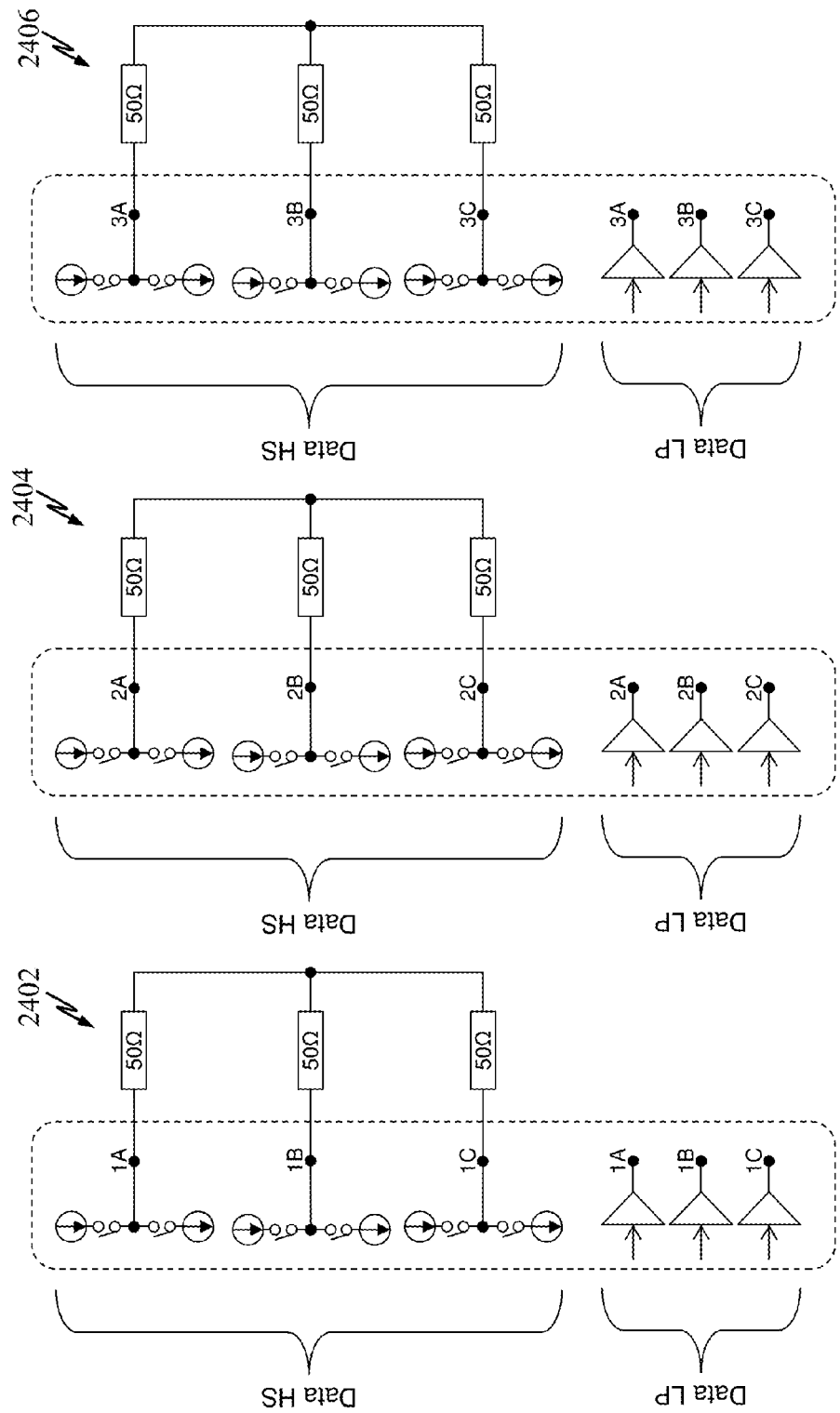

FIG. 24 illustrates an exemplary driver circuit for a 3-factorial differential signaling system.

Figure 1:
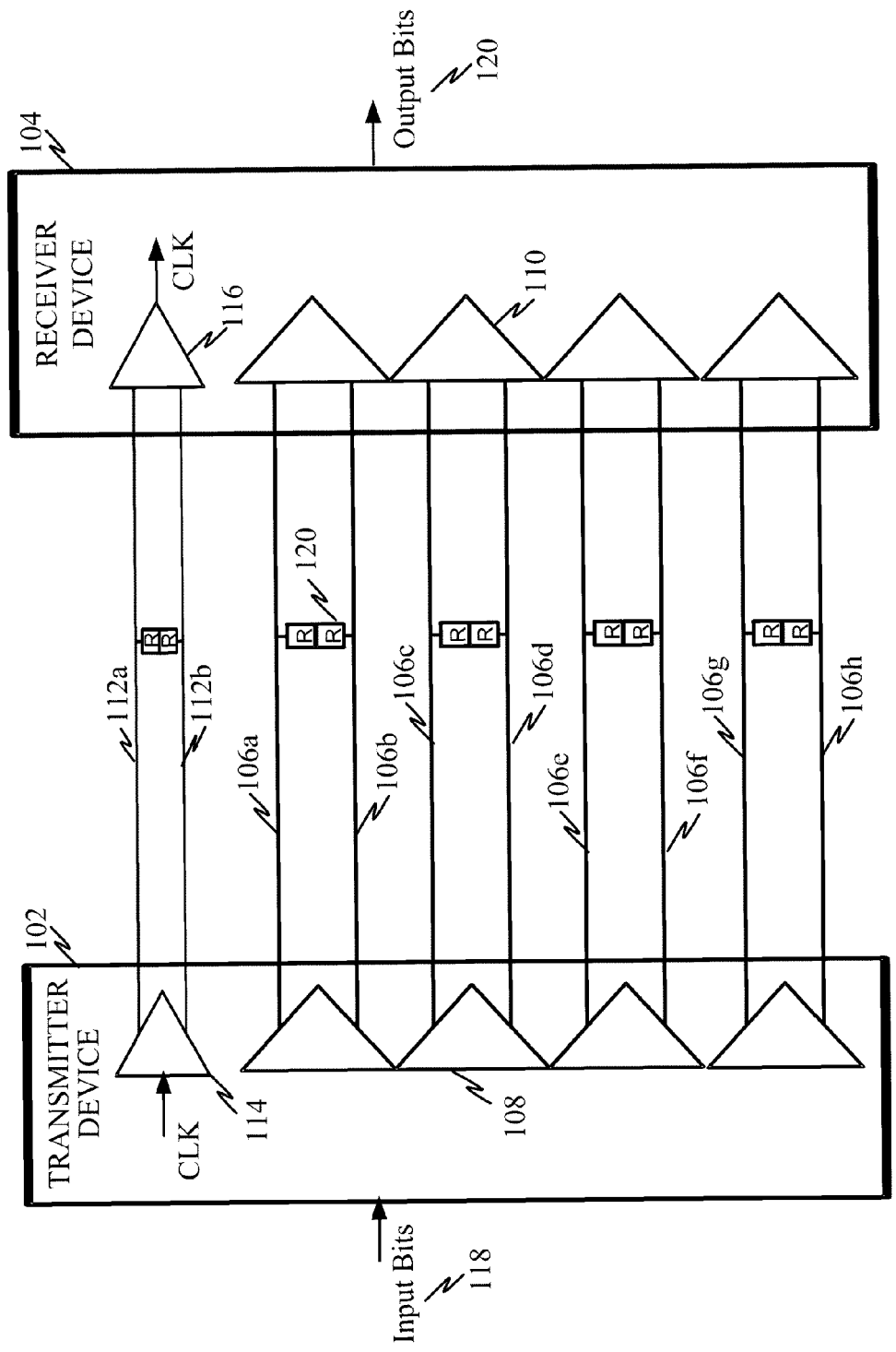
Figure 25:
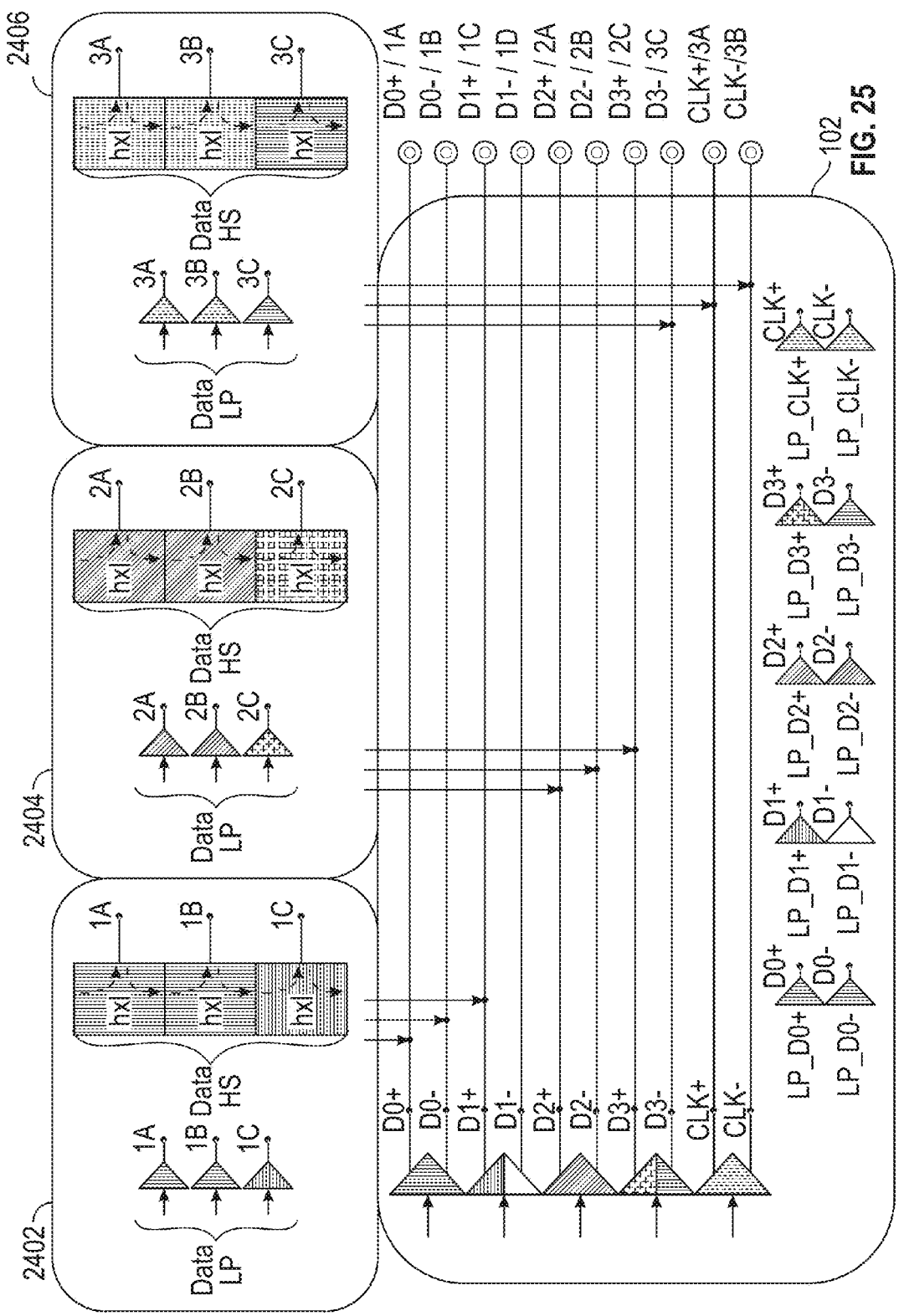

FIG. 25 illustrates the shared components of the 4-lane D-PHY transmitter in FIG. 1 and the three 3-factorial differential signaling driver circuits of FIG. 24.

Figure 26:
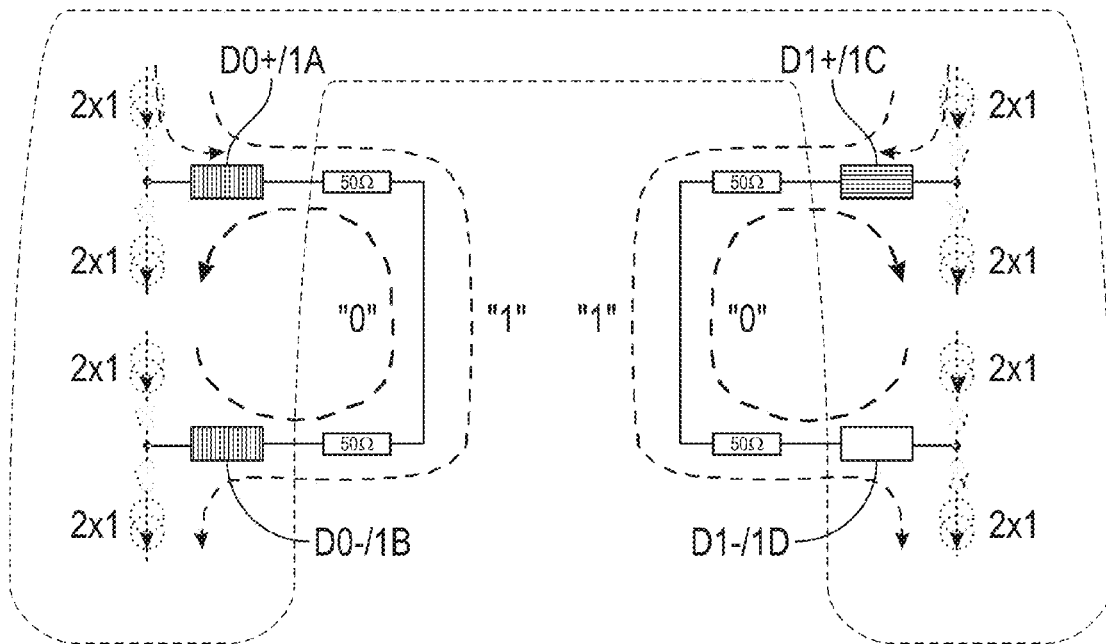
Figure 27:
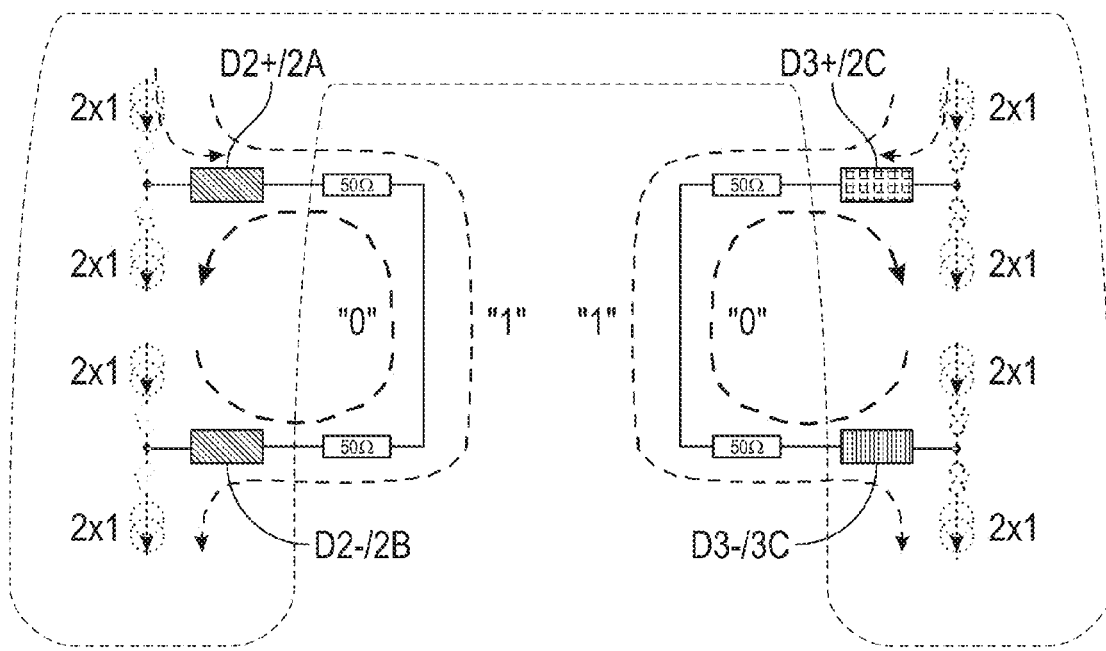
Figure 28:
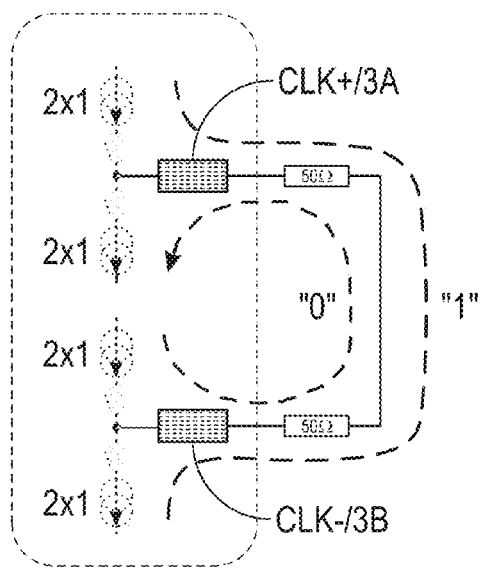

FIGS. 26, 27, and 28 illustrate combined driver circuits (from FIG. 25) may be configured for D-PHY mode operation.

Figure 29:
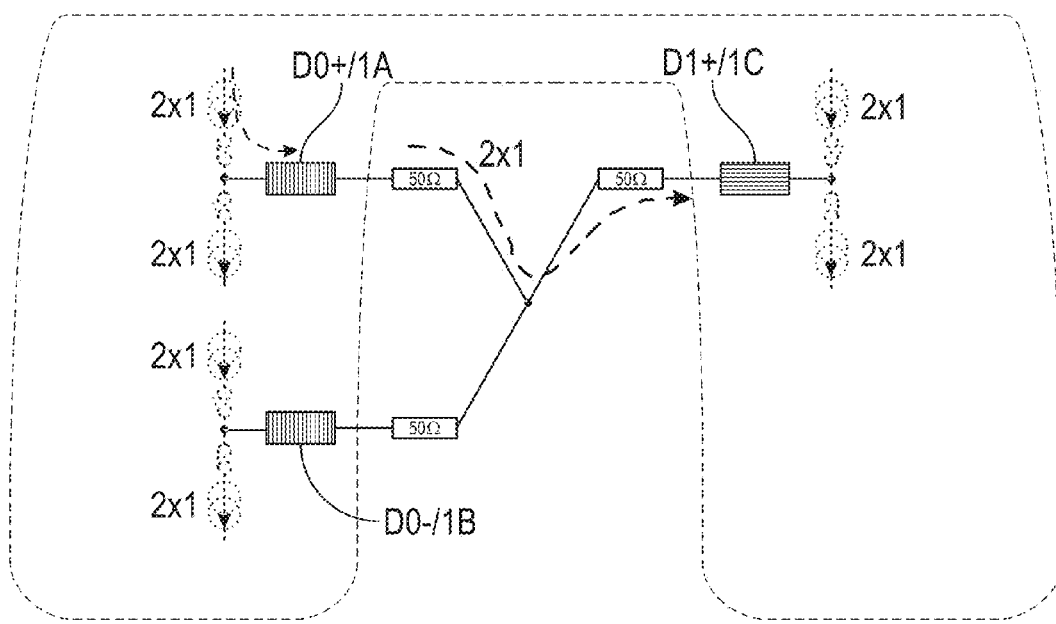
Figure 30:
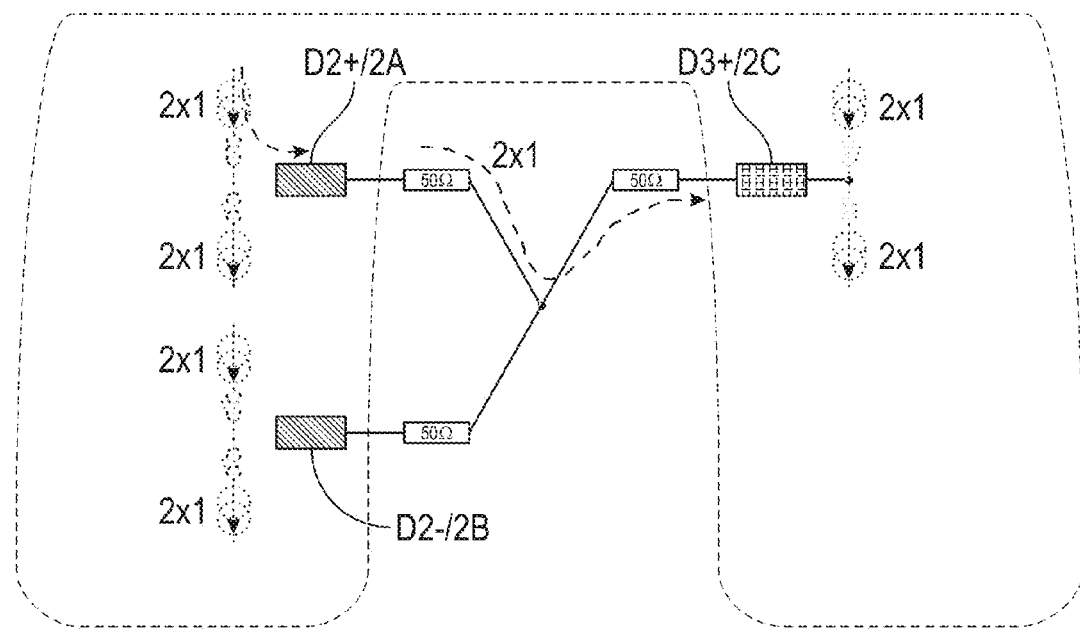
Figure 31:
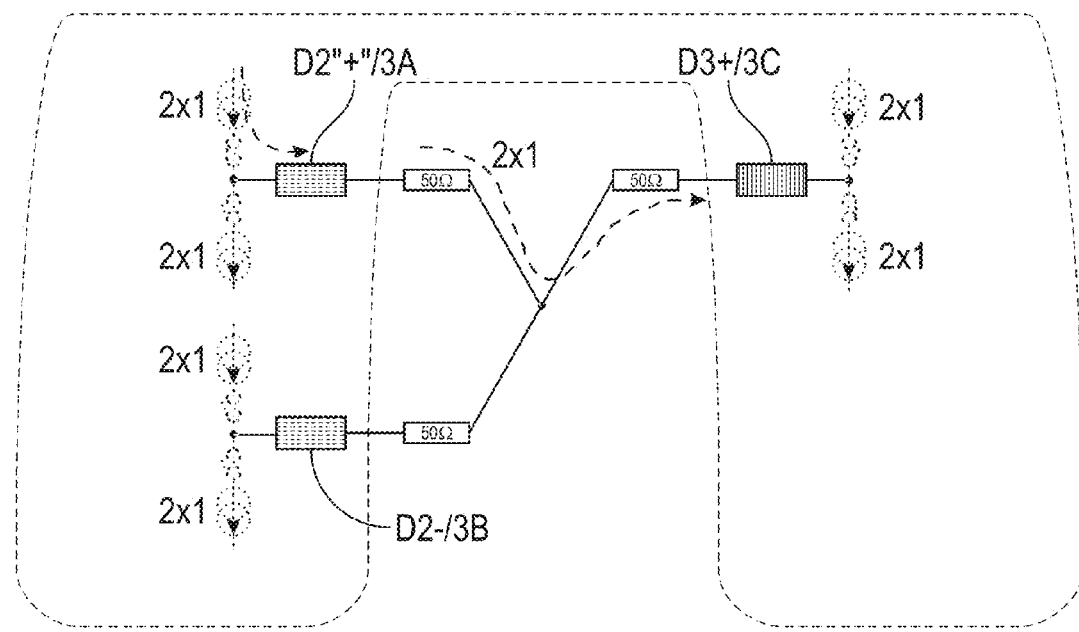

FIGS. 29, 30, and 31 illustrate how combined driver circuits (from FIG. 25) may be configured for 3-factorial mode operation.

Figure 32:
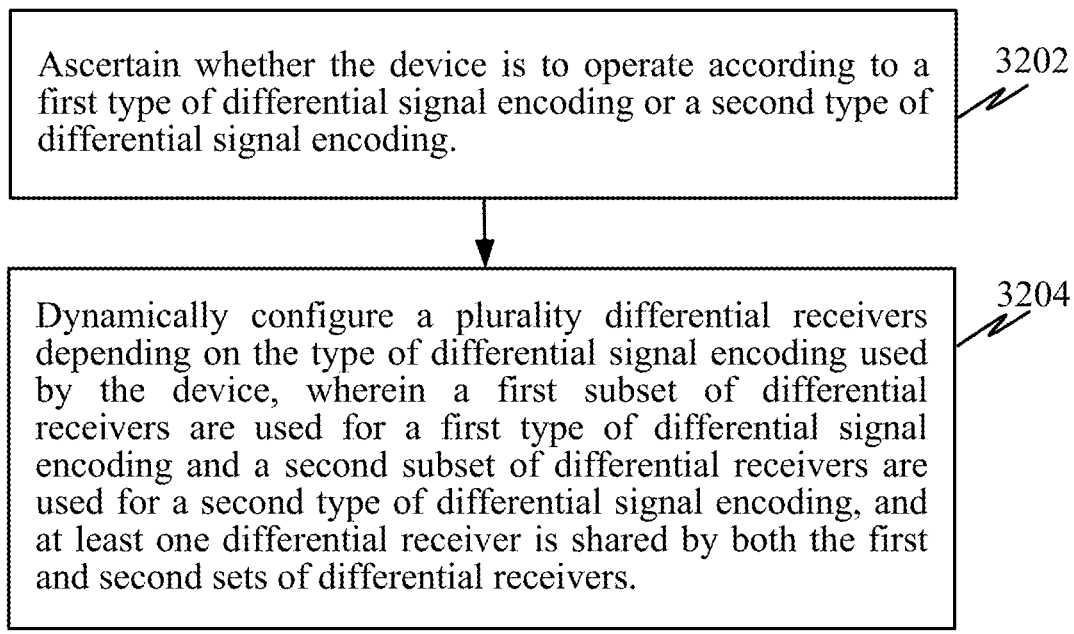

FIG. 32 illustrates a method for sharing a termination network for different types of differential signals used by a device.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

Overview

A way to reuse a receiver circuit (or termination network) for D-PHY differential signaling and N-factorial differential signaling is provided. A first end of each of a plurality dynamically configurable switches is coupled to a common node. A first end of each of a plurality of resistances is coupled to a second end of a corresponding switch. A plurality of terminals receive differential signals and each terminal is coupled to a corresponding second end of a resistance. Each of a plurality differential receivers is coupled between two terminals of the termination network, wherein a first differential receiver and a second differential receiver are coupled to the same two terminals, the first differential receiver is used when the differential signals use a first type of differential signal encoding, the second differential receiver is used when the differential signals use a second type of differential signal encoding.

D-PHY Differential Signaling

FIG. 1 illustrates a D-PHY differential signaling system. A transmitter device 102 may include a plurality of differential drivers 108, each differential driver 108 coupled to a pair of wires/conductors 106a/106b, 106c/106d, 106e/106f, and 106g/106h. A receiver device 104 may include a plurality of differential receivers 110, each differential receiver 110 coupled to one of the pair of wires/conductors 106a/106b, 106c/106d, 106e/106f, and 106g/106h. A resistance R 120 may be present between each pair of wires/conductors 106a/106b, 106c/106d, 106e/106f, and 106g/106h. The transmitter device 102 receives input bits 118, encodes them into differential signals, and transmits them to the receiver device 104 as differential signals through the differential drivers 108 via each pair of wires/conductors 106a/106b, 106c/106d, 106e/106f, and 106g/106h. The receiver device 104 receives the differential signals via each pair of wires/conductors 106a/106b, 106c/106d, 106e/106f, and 106g/106h through the differential receivers 110, decodes the differential signals, and provides output bits 120. In this typical differential signaling system, n wires and n/2 drivers/receivers are used and are capable of representing up to $2^{(n/2)}$ states (or n/2 bits) per cycle. Additionally, a dedicated pair of wires 112a/112b are used for a clock signal (CLK). That is, the differential driver 114 receives a clock (CLK) signal and transmits it as a differential clock signal over the dedicated pair of wires 112a/

112b. The differential receiver 116 receives the differential clock signal and provides the clock (CLK) signal.

Figure 2:
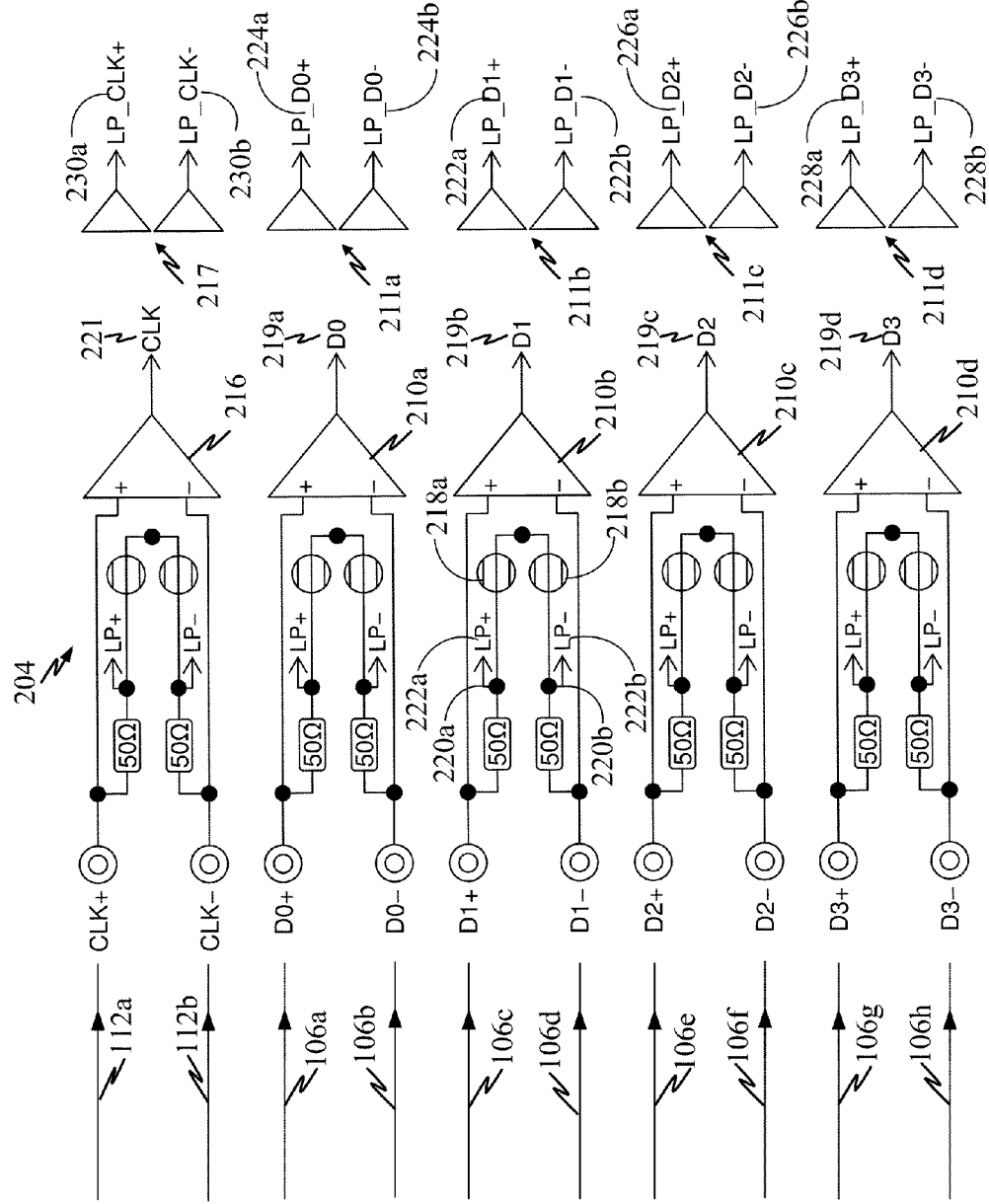

FIG. 2 further illustrates the components of a D-PHY receiver system. This receiver system (receiver circuit 204) may illustrate one example of the receiver device 104 in FIG. 1. A receiver circuit 204 may be configurable to operate in different modes. For example, the receiver circuit 204 may be used, for example, for D-PHY differential signaling (e.g., D-PHY high-speed mode) and/or D-PHY single-ended signaling (D-PHY low-power (LP) mode). The receiver circuit 204 may include a plurality of differential receivers 210a, 210b, 210c, 210d, and 216 that may be coupled to a pair of conductors 106a/106b, 106c/106d, 106e/106f, 106g/106h, and 112a/112b. Additionally, a plurality of switches 218a and 218b may serve to configure the receiver circuit 204 for either D-PHY differential signaling operation or D-PHY single-ended signaling operation. When used for D-PHY differential signaling operation, the differential signals 219a, 219b, 219c, 219d, and 221 are the outputs of the differential receivers 210a, 210b, 210c, 210d, and 216. When used for D-PHY single-ended signaling operation, the output signals 222a/222b, 224a/224b, 226a/226b, 228a/228b, and 230a/230b are the outputs at each of a plurality of nodes 220a and 220b (which may be considered single ended receivers 211a, 211b, 211c, 211d, and 217). The configuration of the switches 218a and 218b is discussed in more detail in FIGS. 5-15.

N-Factorial Differential Signaling

Figure 3:
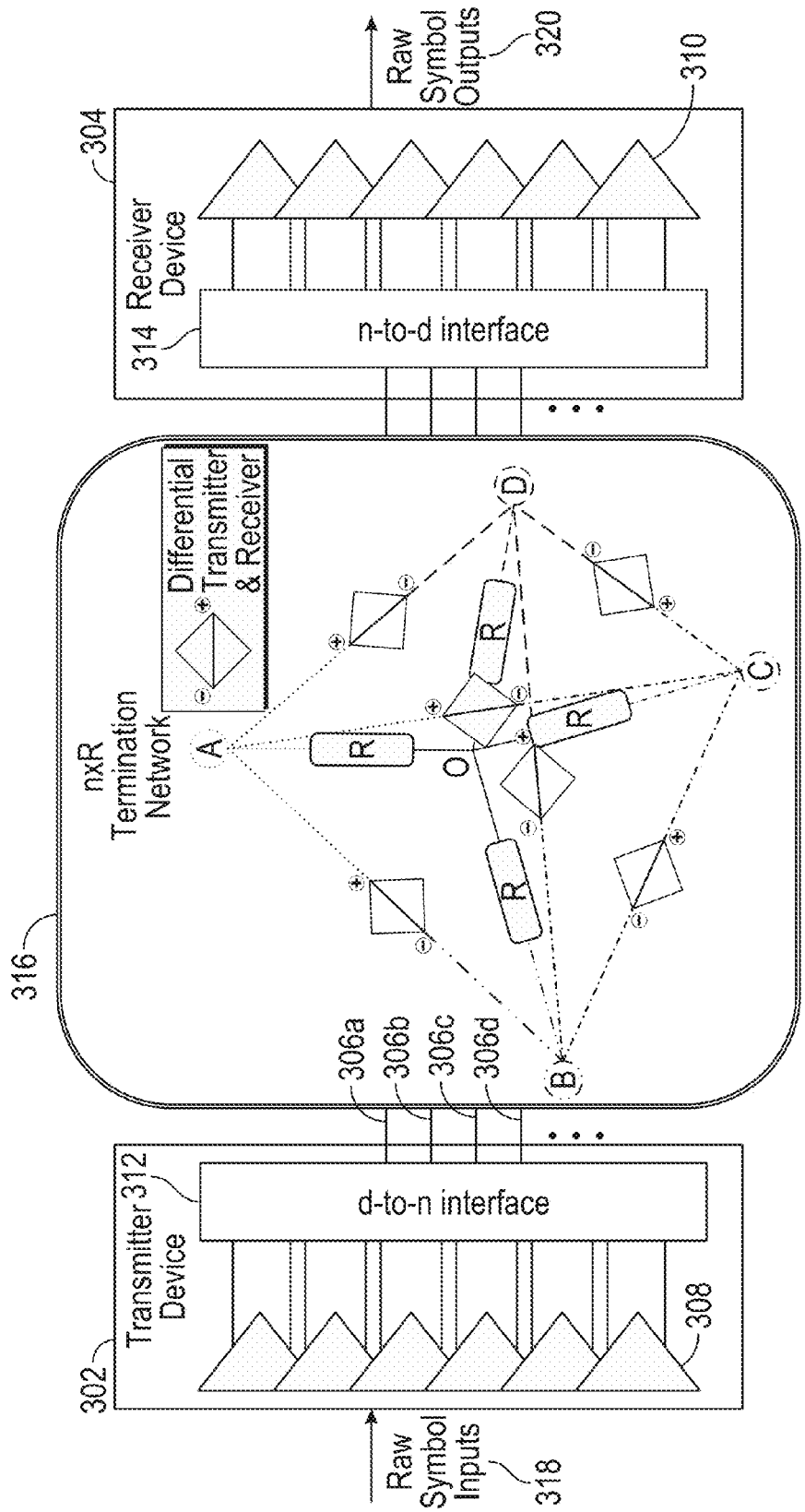
FIG. 3 illustrates an N-factorial differential signaling system.

FIG. 3 illustrates an N-factorial differential signaling system. A transmitter device 302 may include a plurality of drivers 308 coupled to a d-to-n interface 312, the d-to-n interface 312 coupled to a plurality of wires/conductors 306a, 306b, 306c, and 306d. A receiver device 304 may include an n-to-d interface 314 coupled to the plurality of wires/conductors 306a, 306b, 306c, and 306d and a plurality of receivers 310. In this approach, an n×R termination network 316 may be implemented by the drivers 308 and d-to-n interface 312 at the transmitter device 302 and the n-to-d interface 314 and receivers 310 at the receiver device 304, to more efficiently transmit differential signals across the wires/conductors 306a, 306b, 306c, and 306d.

The transmitter device 302 receives raw symbol inputs 318, encodes them into differential signals, and transmits them to the receiver device 304 via a combination of wires/conductors 306a, 306b, 306c, and 306d. The receiver device 304 receives the differential signals via the wires/conductors 306a, 306b, 306c, and 306d, decodes the differential signals, and provides raw symbol outputs 320.

In this termination network 316 differential signaling system, n wires are used and are capable of transmitting up to n! states (or $\log_2$ n! bits) per cycle. This is significantly more efficient than the typical differential signaling system of FIGS. 1 and 2. Note that as used and described herein, the term "termination network" refers to an arrangement and/or configuration of resistance elements between drivers and/or receivers, this "termination network" is distinct from the characteristic impedance of a conductor/wire and/or matching termination that is sometimes used along a conductor/wire to avoid/minimize signal reflections. Consequently, the "termination network" is present on the driver/receiver side rather than the conductor/wire side.

Figure 4:
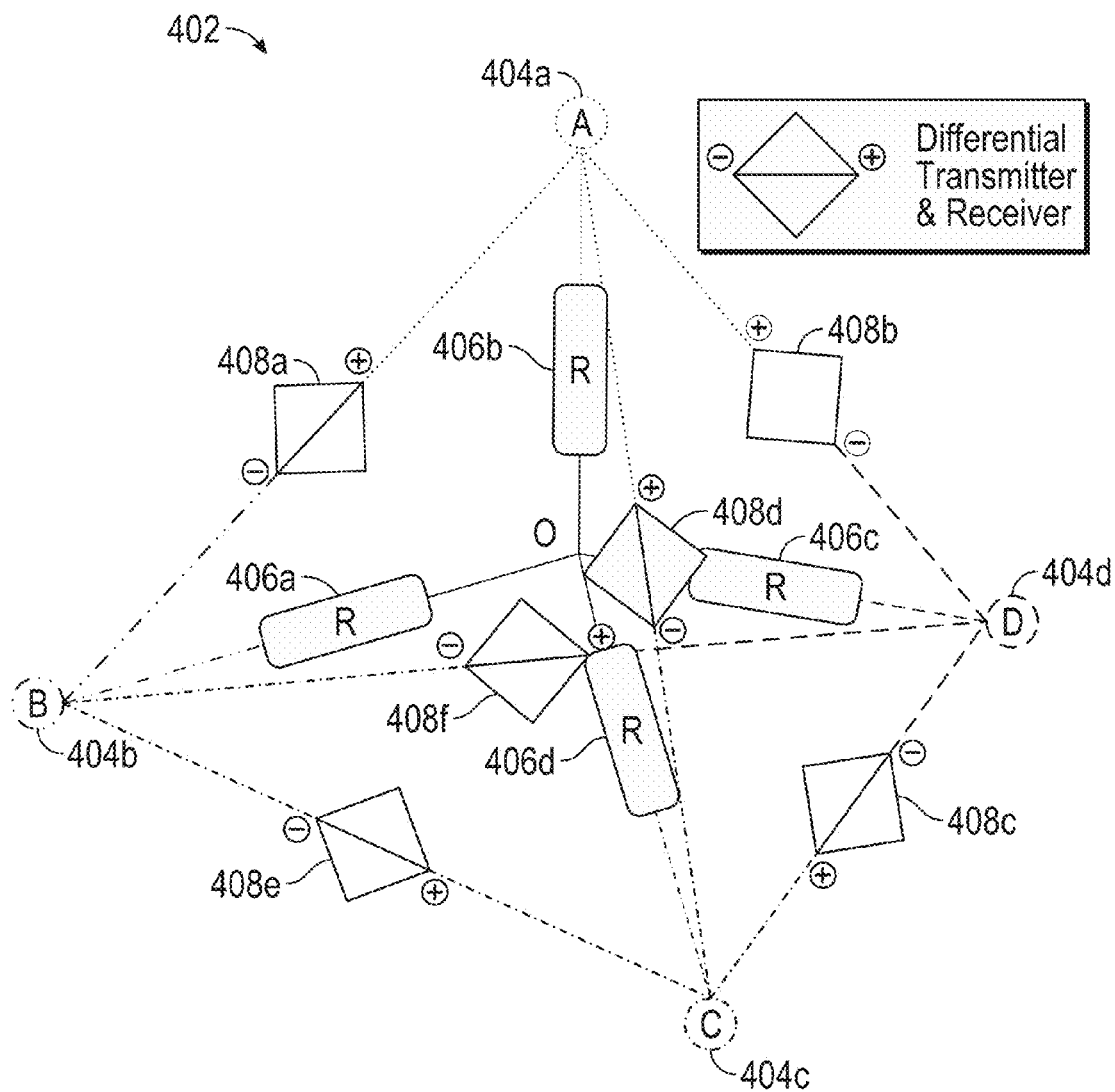
FIG. 4 illustrates a 4-wire tetrahedron termination network for 4-factorial differential signaling.

FIG. 4 illustrates a 4-wire tetrahedron termination network 402 for 4-factorial differential signaling. The tetrahedron termination network 402 may be illustrated with four (4) vertices node A 404a, node B 404b, node C 404c, and node D 404d, with each vertex connecting one end of a termination resistance R 406a, 406b, 406c, and 406d, while the other end of all termination resistances R is coupled together at a node O. Each vertex node A 404a, node B 404b, node C 404c, and node D 404d may couple to a conductor (e.g., conductors 306a, 306b, 306c, and 306d in FIG. 3) to transmit and/or receive differential signals over such conductors. The six (6) edges of the tetrahedron termination network 402 may be defined from the vertices lines AB, CD, AC, AD, CB, and DB. Each of these edges has one differential driver 408a, 408b, 408c, 408d, 408e, and 408f (comprising a differential transmitter or driver and a differential receiver). Each termination resistance R is coupled to three (3) of the differential drivers. Here, each differential driver 408a, 408b, 408c, 408d, 408e, and 408f may include a differential driver/transmitter and a differential sink/receiver.

Figure 5:
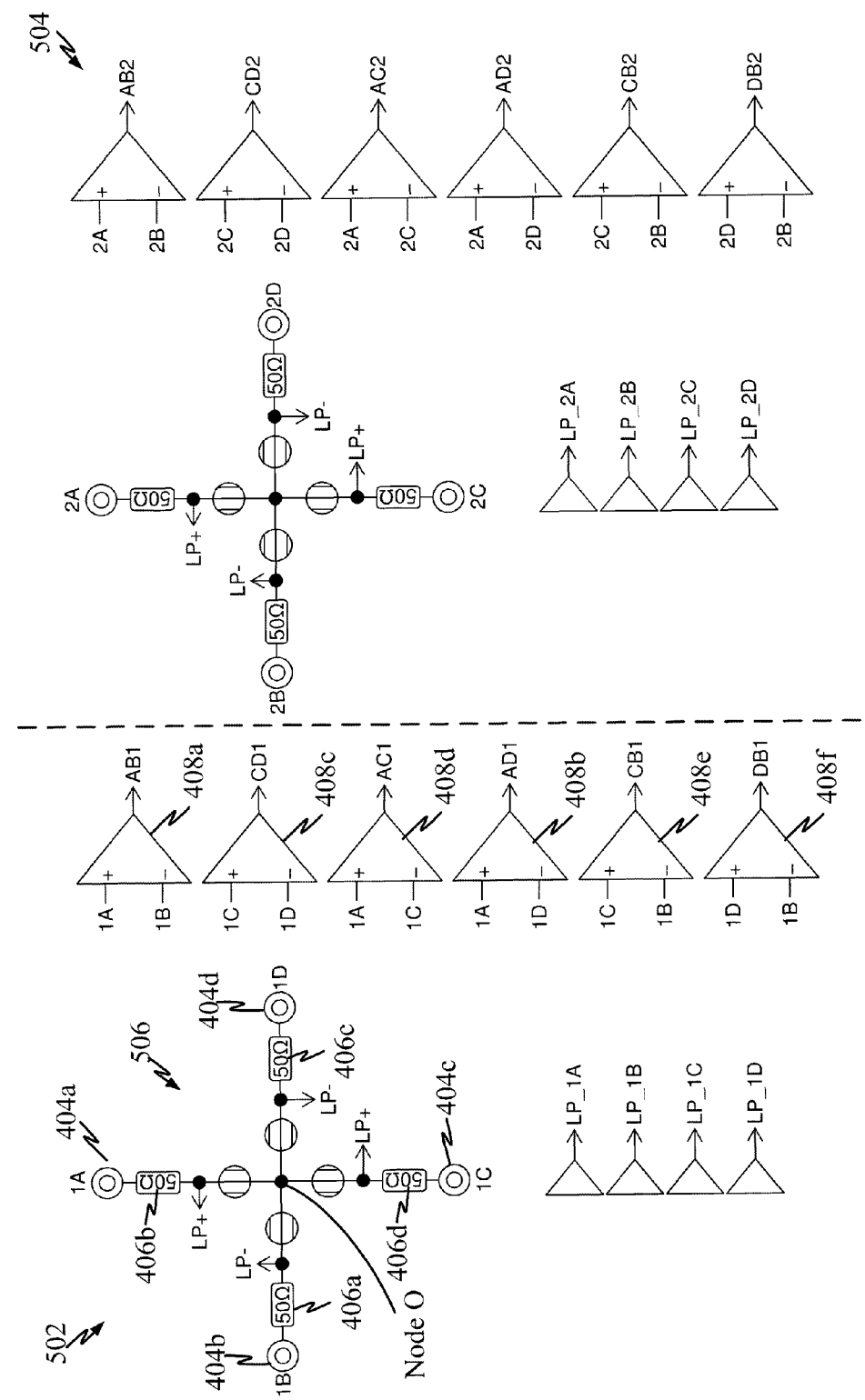
FIG. 5 illustrates an exemplary receiver circuit (or termination network) for a 4-factorial differential signaling system.

Shared Receiver Circuit for D-PHY and N-Factorial Differential Signaling Systems FIG. 5 illustrates an exemplary receiver circuit (or termination network) for a 4-factorial differential signaling system. In this example, two receiver circuits 502 and 504 are shown, each capable of coupling to four (4) conductors. A first receiver circuit 506 may include node A 404a, node B 404b, node C 404c, and node D 404d, each node A, B, C, and D, coupled to a resistance R 406a, 406b, 406c, and 406d and those resistances coupled to a common node O. Similarly, the receivers 408a, 408b, 408c, 408d, 408e, and 408f of the termination network in FIG. 4 are also illustrated herein.

Figure 6:
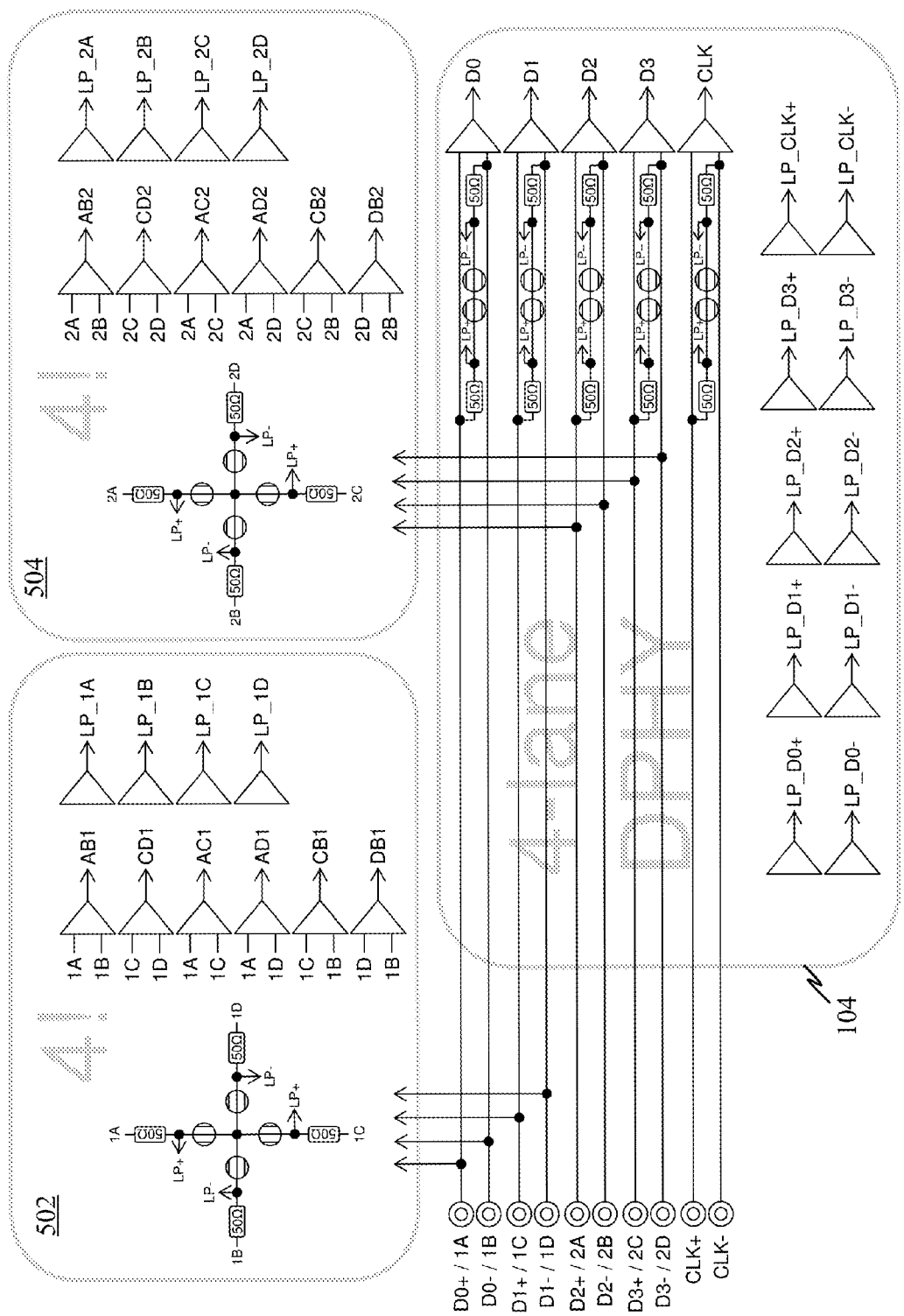
FIG. 6 illustrates the components of the 4-lane D-PHY receiver and the 4-factorial differential signaling receiver circuits of FIG. 5.

FIG. 6 illustrates the components of the 4-lane D-PHY receiver 104 and the 4-factorial differential signaling receiver circuits 502 and 504 of FIG. 5. As can be appreciated here, the same eight conductors (or pins) used by the 4-lane D-PHY receiver 104 can be used by the two 4-factorial differential signaling receiver circuits 502 and 504. For instance, a first set of conductors coupled to D0+/D0− and D1+/D1− may also be coupled to the first receiver circuit 502 nodes 1A, 1B, 1C, and 1D. Similarly, a second set of conductors coupled to D2+/D2− and D3+/D3− may also be coupled to the second receiver circuit 504 nodes 2A, 2B, 2C, and 2D. It should be appreciated that 4-lane D-PHY receiver 104 and its components are equivalent the receiver circuit 204 of FIG. 2.

Figure 7:
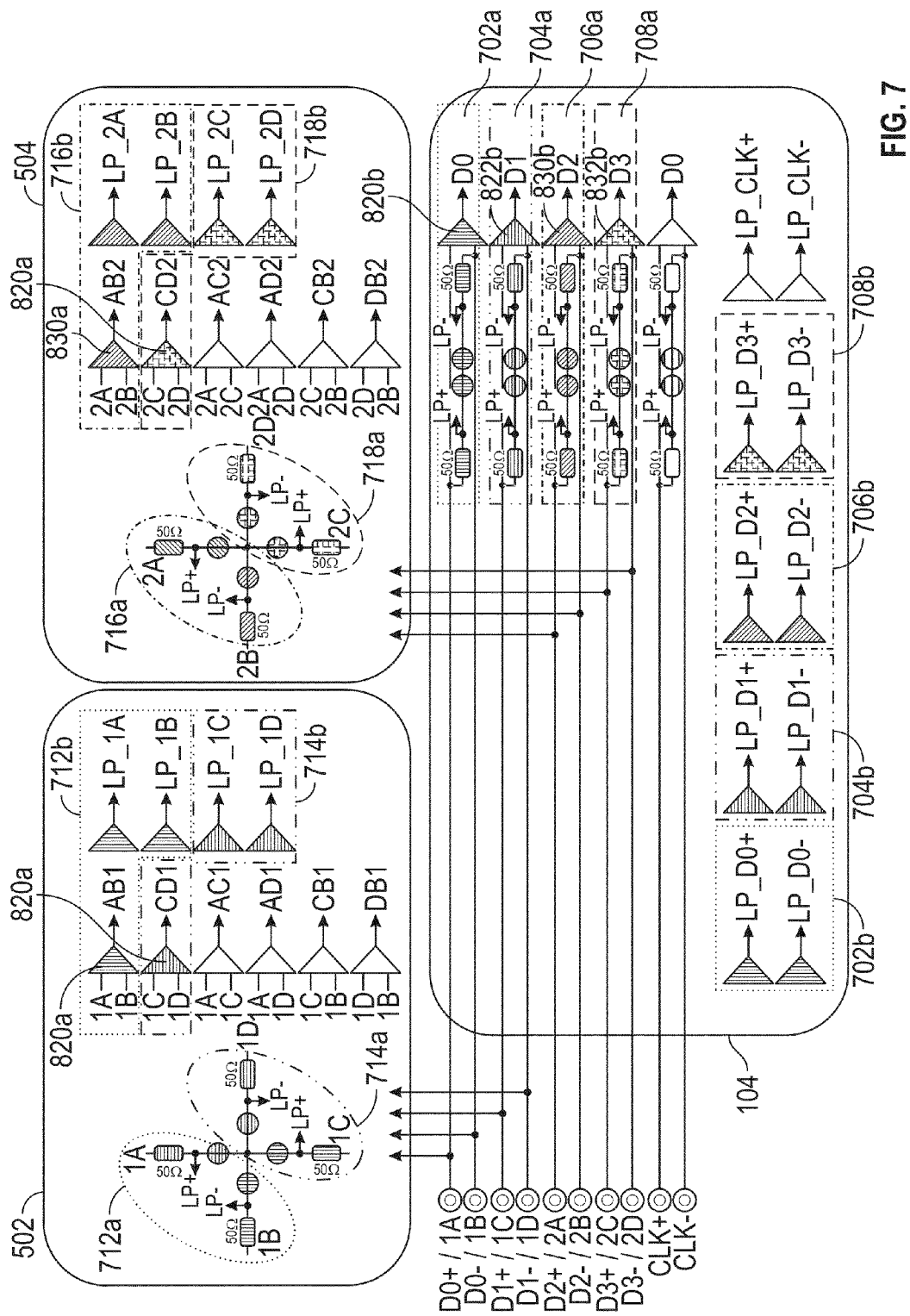
FIG. 7 illustrates shareable portions of the 4-lane D-PHY receiver and the 4-factorial differential signaling receiver circuits.

FIG. 7 illustrates shareable portions of the 4-lane D-PHY receiver 104 and the 4-factorial differential signaling receiver circuits 502 and 504 of FIG. 5. Here, a first receiver circuit 702a and 702b in the D-PHY receiver 104 has the same structure, arrangement, and components as a second receiver circuit 712a and 712b in the 4-factorial first receiver circuit 502. A third receiver circuit 704a and 704b in the D-PHY receiver 104 has the same structure, arrangement, and components as a fourth receiver circuit 714a and 714b in the 4-factorial first receiver circuit 502. A fifth receiver circuit 706a and 706b in the D-PHY receiver 104 has the same structure, arrangement, and components as a sixth receiver circuit 716a and 716b in the 4-factorial second receiver circuit 504. A seventh receiver circuit 708a and 708b in the D-PHY receiver 104 has the same structure, arrangement, and components as an eighth receiver circuit 718a and 718b in the 4-factorial second receiver circuit 504.

Figure 8:
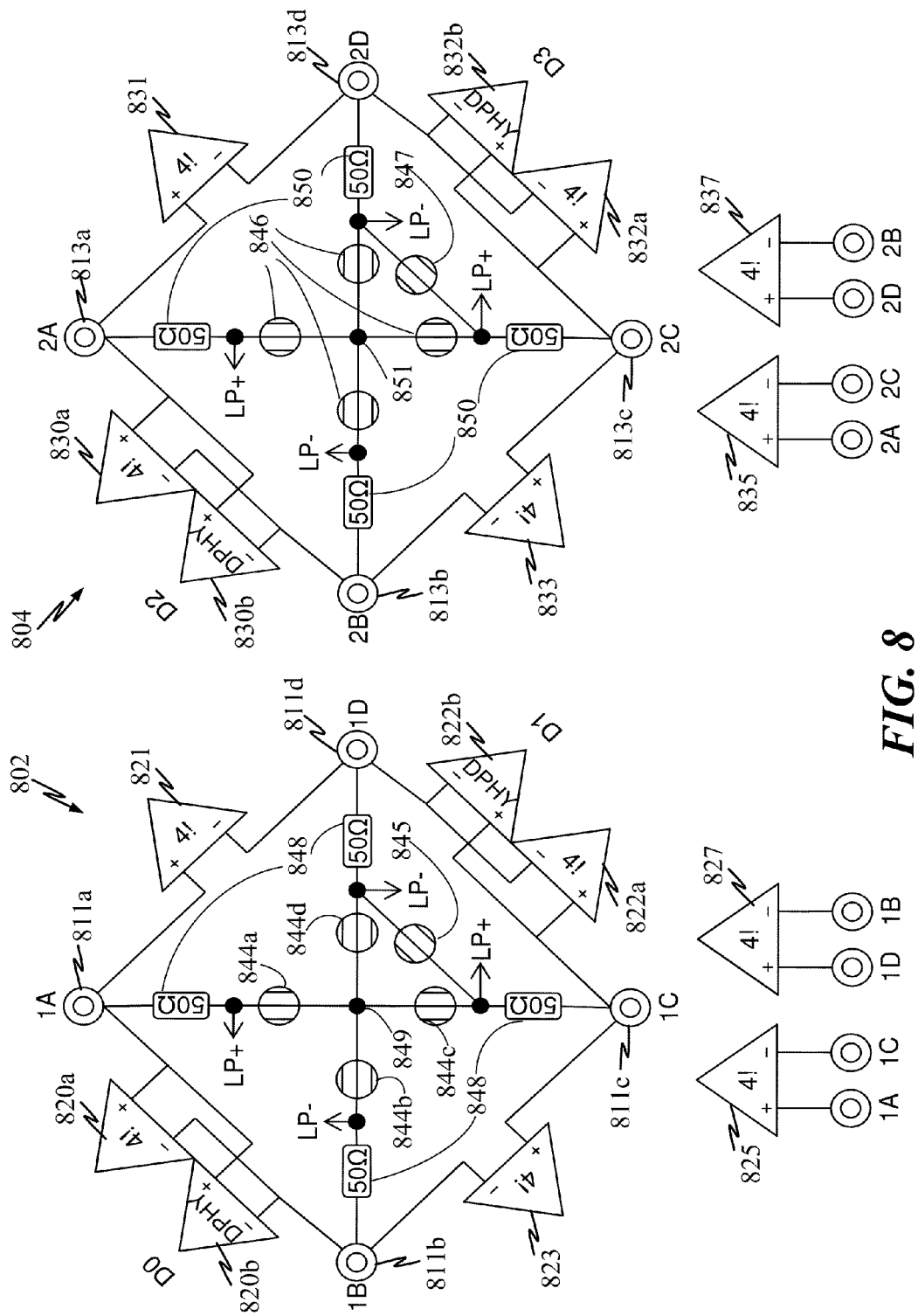
FIG. 8 illustrates how the same or equivalent circuits the 4-lane D-PHY receiver and the 4-factorial differential signaling receiver circuits of FIG. 7 may be shared in a combined receiver circuit.

FIG. 8 illustrates how the same or equivalent circuits the 4-lane D-PHY receiver 104 and the 4-factorial differential signaling receiver circuits 502 and 504 in FIG. 7 may be shared in a combined receiver circuit 802/804. Here, a first combined receiver circuit 802 combines the first receiver circuit 702a/702b and second receiver circuit 712a/712b. The first combined receiver circuit 802 also combines the third receiver circuit 704a/704b and fourth receiver circuit 714a/714b. Likewise, a second combined receiver circuit 804 combines the fifth receiver circuit 706a/706b and sixth receiver circuit 716a/716b. The second combined receiver circuit 804 also combines the seventh receiver circuit 708a/708b and eight receiver circuit 718a/718b. Note that a set of switches are present to dynamically open or close various electrical paths of the first combined receiver circuit 802 and second combined receiver circuit 804.

The 4-lane D-PHY receiver 104 and the 4-factorial differential signaling receiver circuits 502 and 504 may be considered a termination network. The termination network may include: a plurality dynamically configurable switches 844, 845, 846 and 847, a plurality of resistances 848 and 850, a plurality of terminals 1A, 1B, 1C, 1D, 2A, 2B, 2C, and 2D, and a plurality receivers 820, 822, 821, 823, 825, and 827, 830, 832, 831, 833, 835 and 837. Each of the nodes/terminals 1A 811a, 1B 811b, 1C 811c, 1D 811d, 2A 813a, 2B 813b, 2C 813c, and/or 2D 813d may be coupled to a different conductor/wire. A first end of each switch 844 and/or 846 is coupled to a common node 849, 851. A first end of each resistance is coupled to a second end of a corresponding switch. Each terminal is coupled to a corresponding second end of a resistance. Each receiver is coupled between two terminals of the termination network. A bridging switch 845 or 847 in each of the first and second combined receiver circuits 802 and 804 serves to bridge the first end of two resistances. Such bridging switch 845 or 847 allows bypassing the common node by opening switches 844/846 to disconnect two or more resistances from the common node.

A first subset of differential receivers 820a, 821, 822a, 823 may be used for a first type of differential signal encoding and a second subset of differential receivers 820b, 822b may be used for a second type of differential signal encoding. At least one differential receiver 820, 822 is shared by both the first and second sets of differential receivers. One or more of the switches 844 and 846 are turned off or on depending on whether the first subset of differential receivers is used or the second subset of differential receivers is used. Note that, while receivers 820a, 820b, 822a, 822b, 830a, 830b, 832a, 832b are illustrated as distinct or individual receivers, the paired receivers may also be combined into a single receiver. For instance, receivers 820a and 820b may be a single shared receiver, receivers 822a and 822b may be a single shared receiver, receivers 830a and 830b may be a single shared receiver, and receivers 832a and 832b may be a single shared receiver. These receivers 820, 822, 830, and 832 may be configurable to operate according to either the first or second type of differential signal encoding.

FIG. 9 illustrates how the first combined receiver circuit 802 of FIG. 8 may be configured for D-PHY low-power (LP) (single ended signaling) mode operation 902a as well as for D-PHY high-speed (HS) (differential signaling) mode operation 902b. For D-PHY low-power (LP) (single ended signaling) mode of operation 902a, the switches 844a, 844b, 844c, 844d, and 845 are all turned off (e.g., open or disconnected) and the outputs LP+ and LP− are taken at the first ends of the resistances. Alternatively, the outputs LP+ and LP− may be taken at the nodes/terminals 1A, 1B, 1C, 1D, 2A, 2B, 2C, and/or 2D. For D-PHY high-speed (HS) (differential signaling) mode of operation 902b, the switches 844a, 844b, 845 are all turned on (e.g., closed or connected) and the switches 844c and 844d are turned off (e.g., open or disconnected) and the outputs are taken at the receivers 820b and 822b.

Figure 10:
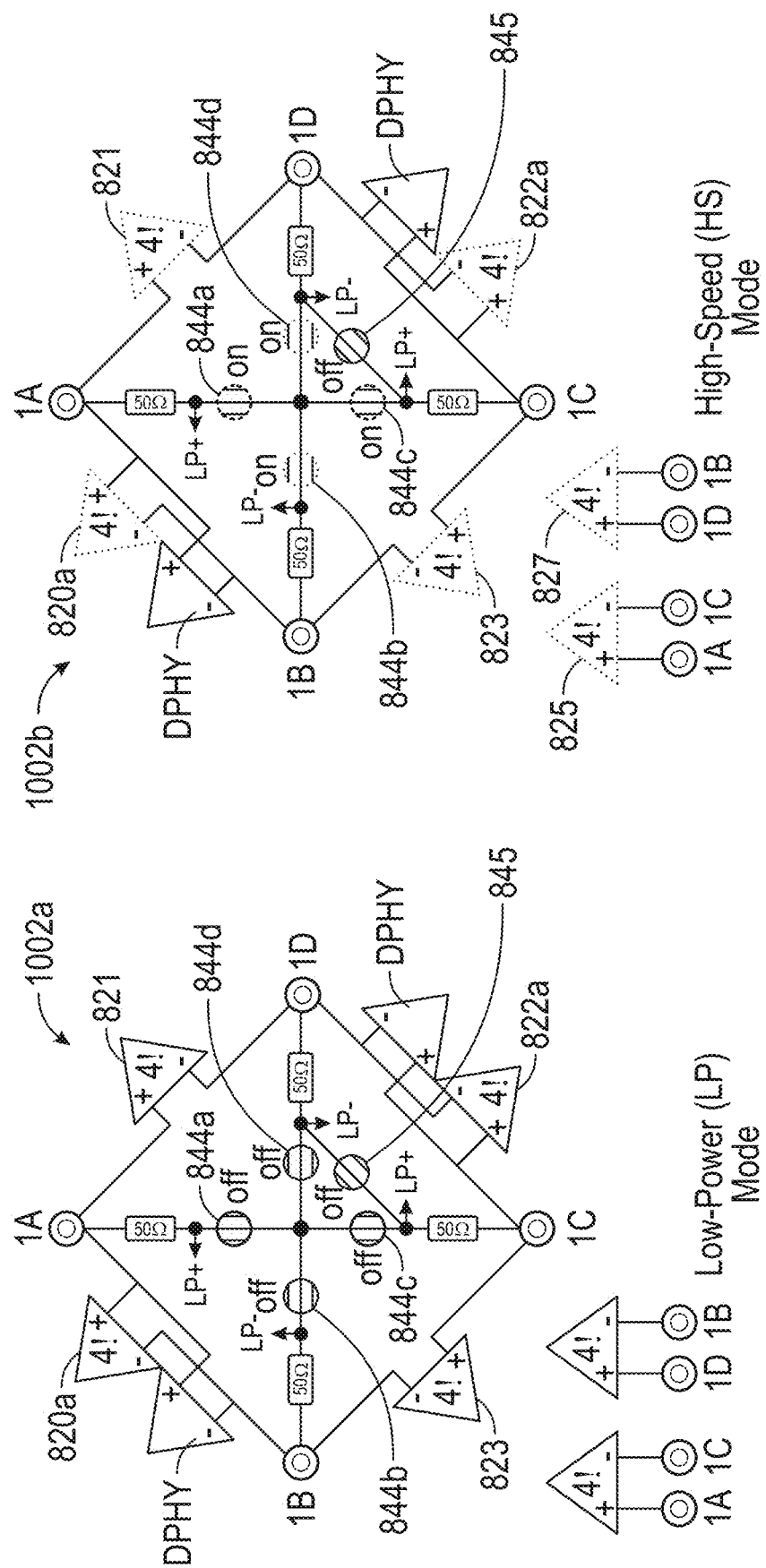
FIG. 10 illustrates how the first combined receiver circuit of FIG. 8 may be configured for 4-factorial low-power (LP) (single ended signaling) mode operation as well as for 4-factorial high-speed (HS) (differential signaling) mode operation.

FIG. 10 illustrates how the first combined receiver circuit 802 of FIG. 8 may be configured for 4-factorial low-power (LP) (single ended signaling) mode operation 1002a as well as for 4-factorial high-speed (HS) (differential signaling) mode operation 1002b. For 4-factorial low-power (LP) (single ended signaling) mode operation 1002a, the switches 844a, 844b, 844c, 844d, and 845 are all turned off (e.g., open or disconnected) and the outputs LP+ and LP− are taken at the first ends of the resistances. For 4-factorial high-speed (HS) (differential signaling) mode of operation 1002b, the switches 844a, 844b, 844c, and 844d are all turned on (e.g., closed or connected), the switch 845 is turned off (e.g., open or disconnected), and the outputs are taken at the receivers 820a, 822a, 821, 823, 825, and 827.

FIG. 11 illustrates the components of the 4-lane D-PHY receiver 104 and 3-factorial differential signaling receiver circuits 1102, 1104, and 1106. As can be appreciated here, the same nine conductors (or pins) used by the 4-lane D-PHY receiver 104 can be used by the three 3-factorial differential signaling receiver circuits 1102, 1104, and 1106. For instance, a first set of conductors coupled to D0+/D0− and D1+ may also be coupled to the first receiver circuit 1102 nodes 1A, 1B, and 1C. Similarly, a second set of conductors coupled to D2+/D2− and D3+ may also be coupled to the second receiver circuit 1104 nodes 2A, 2B, and 2C. Likewise, a third set of conductors coupled to D3− and CLK+/CLK− may also be coupled to the third receiver circuit 1106 nodes 3C, 3A, and 3B.

Similar to FIG. 7, FIG. 12 illustrates the shareable portions of the 4-lane D-PHY receiver 104 and the 3-factorial differential signaling receiver circuits 1102, 1104 and 1106 of FIG. 11.

Similar to FIG. 8, FIG. 13 illustrates how the 4-lane D-PHY receiver 104 and the 3-factorial differential signaling receiver circuits 1102, 1104 and 1106 in FIG. 12 may be combined into a first, second, and third combined receiver circuits 1302, 1304, and 1306.

Similar to FIG. 9, FIG. 14 illustrates how the first combined receiver circuit 1302, second combined receiver circuit 1304 and third combined receiver circuit 1306 of FIG. 13 may be configured for D-PHY mode operation. In this example, the first, second, and third combined receiver circuits 1302, 1304, and 1306 are illustrated as configured for D-PHY high speed (HS) differential signaling mode of operation (similar to FIG. 9).

Similar to FIG. 10, FIG. 15 illustrates how the first, second, and third combined receiver circuits 1302, 1304, and 1305 may be configured for 3-factorial mode operation. In this example, the first, second, and third combined receiver circuits 1302, 1304, and 1306 are illustrated as configured for 3-factorial high speed (HS) differential signaling mode of operation (similar to FIG. 10).

Shared Transmitter Circuit for D-PHY and N-Factorial Differential Signaling Systems Similar to the sharing of the receiver circuits (or termination network) for D-PHY and N-factorial differential signaling system illustrated in FIGS. 5 to 15, transmitter circuits (or termination network) for D-PHY and N-factorial differential signaling systems can also be combined and/or shared.

FIG. 16 further illustrates components of a D-PHY transmitter system. This transmitter system may illustrate one example of the transmitter device 102 in FIG. 1. A transmitter circuit 1604 may be configurable to operate in different modes. For example, the transmitter circuit 1604 may be used, for example, for D-PHY differential signaling (e.g., D-PHY high-speed mode) and/or D-PHY single-ended signaling (D-PHY low-power (LP) mode). The transmitter circuit 1602 may include a first driver set 1612 including a plurality of differential drivers 1608a, 1608b, 1608c, 1608d, and 1614, a second driver set 1610 including single-ended drivers 1622a, 1622b, 1622c, 1622d, and 1620, where the drivers may be coupled to conductors 106a/106b, 106c/106d, 106e/106f, 106g/106h, and 112a/112b, respectively. The differential driver 1614 receives a clock (CLK) signal as an input and transmits it as a differential clock signal over the dedicated pair of wires 112a/112b. When used for D-PHY differential signaling operation, the differential drivers 1608a, 1608b, 1608c, and 1608d may receive a data signal and transmits each data signal as a differential data signal over a corresponding pair of wires 106a/106b, 106c/106d, 106e/106f, and 106g/106h. When used for D-PHY single-ended signaling operation, the single-ended drivers 1622a, 1622b, 1622c, 1622d, and 1620 signals over corresponding wires 106a/106b, 106c/106d, 106e/106f, and 106g/106h, 112a/112b. The configuration of the drivers is discussed in more detail in FIGS. 17 to 30.

FIG. 17 illustrates an exemplary driver circuit (or termination network) for a 4-factorial differential signaling system. In this example, two driver circuits 1702 and 1704 are shown, each coupled to four (4) conductors. Note that each driver circuit 1702 and 1704 may include sets differential drivers 1612 and single-ended drivers 1610 (or portions thereof). Note that each differential driver 1608' or 1608" is represented by configurable or switchable current sources.

FIG. 18 illustrates the components of the 4-lane D-PHY transmitter 102 of FIG. 1 and the 4-factorial differential signaling driver circuits 1702 and 1704 of FIG. 17 (or termination network). As can be appreciated here, the same eight conductors (or pins) used by the 4-lane D-PHY transmitter 102 can be used by the two 4-factorial differential signaling driver circuits 1702 and 1704.

FIG. 19 illustrates shareable portions of the 4-lane D-PHY transmitter 102 and the 4-factorial differential signaling driver circuits 1702 and 1704 of FIG. 18.

FIGS. 20 and 21 illustrate how combined driver circuits (from FIG. 19) may be configured for D-PHY mode operation. FIG. 20 illustrates how a net current flow between the drivers may be construed as a logical "0" or logical "1" for a first pair of differential drivers. FIG. 21 illustrates how a net current flow between the drivers may be construed as a logical "0" or logical "1" for a second pair of differential drivers.

FIGS. 22 and 23 illustrate how combined driver circuits (from FIG. 19) may be configured for 4-factorial mode operation.

FIG. 24 illustrates an exemplary driver circuit for a 3-factorial differential signaling system. In this example, three driver circuits 2402, 2404, and 2406 are shown, each coupled to three (3) conductors.

FIG. 25 illustrates the shared components of the 4-lane D-PHY transmitter 102 and the three 3-factorial differential signaling driver circuits 2402, 2404, and 2406 of FIG. 24. As can be appreciated here, the same nine conductors (or pins) used by the 4-lane D-PHY transmitter 102 can be used by the three 3-factorial differential signaling driver circuits 2402, 2404, and 2406.

FIGS. 26, 27, and 28 illustrate combined driver circuits (from FIG. 25) may be configured for D-PHY mode operation.

FIGS. 29, 30, and 31 illustrate how combined driver circuits (from FIG. 25) may be configured for 3-factorial mode operation.

FIG. 32 illustrates a method for sharing a termination network for different types of differential signals used by a device. First, it is ascertained whether the device is to operate according to a first type of differential signal encoding or a second type of differential signal encoding 3202. For instance, this may be done dynamically, or be a setup line/pin, etc. Then, a plurality differential receivers are dynamically configured depending on the type of differential signal encoding used by the device, wherein a first subset of differential receivers are used for a first type of differential signal encoding and a second subset of differential receivers are used for a second type of differential signal encoding, and at least one differential receiver is shared by both the first and second sets of differential receivers 3204. The first and second sets of differential receivers share at least a plurality of terminals through which differential signals are received.

The first subset of differential receivers may be used for D-PHY differential signaling and the second subset of differential receivers may be used for N-factorial differential signaling. The N-factorial differential signaling may be 4-factorial differential signaling. The N-factorial differential signaling may be 3-factorial differential signaling. When using N-factorial differential signaling, the termination network may be configured for N-factorial low-power (LP) single ended signaling mode operation. When using N-factorial differential signaling, the termination network may be configured for N-factorial high-speed (HS) differential signaling mode operation.

One or more of the components, steps, features and/or functions illustrated in the Figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A termination network for a receiver device, comprising:
a plurality dynamically configurable switches (844*a-d*), a first end of each switch coupled to a common node (849);
a plurality of resistances (848), a first end of each resistance (848) coupled to a second end of a corresponding switch (844*a-d*);
a plurality of terminals (811), each terminal (811) coupled to a corresponding second end of a resistance (848);
a plurality differential receivers (820, 821, 822, 823), each receiver (820, 821, 822, 823) coupled between two terminals of the plurality of terminals, wherein a first subset of differential receivers (820*a*, 821, 822*a*, 823) are used for a first type of differential signal encoding and a second subset of differential receivers (820*b*, 822*b*) are used for a second type of differential signal encoding, and at least a first differential receiver (820, 822) is shared by both the first and second sets of differential receivers.

2. The termination network for a receiver device of claim 1, wherein one or more of the switches are turned off or on depending on whether the first subset of differential receivers is used or the second set of differential receivers is used.

3. The termination network for a receiver device of claim 1, wherein the first differential receiver (820) is used for D-PHY differential signaling and for N-factorial differential signaling.

4. The termination network for a receiver device of claim 3, wherein the N-factorial differential signaling is 4-factorial differential signaling.

5. The termination network for a receiver device of claim 3, wherein the N-factorial differential signaling is 3-factorial differential signaling.

6. The termination network for a receiver device of claim 3, wherein when using D-PHY differential signaling the termination network is configured for D-PHY low-power (LP) single ended signaling mode operation in which all of the switches are turned off and the outputs LP+ and LP− are taken at the first ends of the resistances.

7. The termination network for a receiver device of claim 3, wherein when using D-PHY differential signaling the termination network is configured for D-PHY low-power (LP) single ended signaling mode operation in which all of the switches are turned off and the outputs LP+ and LP− are taken at the plurality of terminals.

8. The termination network for a receiver device of claim 3, wherein when using D-PHY differential signaling the termination network is configured for D-PHY high-speed (HS) differential signaling mode operation in which two of the switches are turned on, a bridging switch between the first ends of two resistances is turned on, and the outputs are taken at a subset of the plurality differential receivers.

9. The termination network for a receiver device of claim 3, wherein when using N-factorial differential signaling the termination network is configured for N-factorial low-power (LP) single ended signaling mode operation in which all of the switches are turned off and the outputs LP+ and LP− are taken at the first ends of the resistances.

10. The termination network for a receiver device of claim 3, wherein when using N-factorial differential signaling the termination network is configured for N-factorial low-power (LP) single ended signaling mode operation in which all of the switches are turned off and the outputs LP+ and LP− are taken at the plurality of terminals.

11. The termination network for a receiver device of claim 3, wherein when using N-factorial differential signaling the termination network is configured for N-factorial high-speed (HS) differential signaling mode operation in which all of the switches are turned on, a bridging switch between the first ends of two resistances is turned off, and the outputs are taken at the plurality differential receivers.

12. The termination network for a receiver device of claim 3, wherein at least two of the plurality of differential receivers are shared when using N-factorial differential signaling and D-PHY differential signaling.

13. A method for sharing a termination network for different types of differential signals used by a device, comprising:
ascertaining whether the device is to operate according to a first type of differential signal encoding or a second type of differential signal encoding;
dynamically configuring a plurality differential receivers depending on the type of differential signal encoding used by the device, wherein a first subset of differential receivers are used for a first type of differential signal encoding and a second subset of differential receivers are used for a second type of differential signal encoding, and at least one differential receiver is shared by both the first and second sets of differential receivers.

14. The method of claim 13, wherein the first and second sets of differential receivers share at least a plurality of terminals through which differential signals are received.

15. The method of claim 13, wherein the first subset of differential receivers is used for D-PHY differential signaling and the second subset of differential receivers is used for N-factorial differential signaling.

16. The method of claim 15, wherein the N-factorial differential signaling is 4-factorial differential signaling.

17. The method of claim 15, wherein the N-factorial differential signaling is 3-factorial differential signaling.

18. The method of claim 15, wherein when using N-factorial differential signaling the termination network is configured for N-factorial low-power (LP) single ended signaling mode operation.

19. The method of claim 15, wherein when using N-factorial differential signaling the termination network is configured for N-factorial high-speed (HS) differential signaling mode operation.

20. A termination network for a receiver device, comprising:
    means for ascertaining whether the device is to operate according to a first type of differential signal encoding or a second type of differential signal encoding;
    means for configuring a plurality differential receivers depending on the type of differential signal encoding used by the device, wherein a first subset of differential receivers are used for a first type of differential signal encoding and a second subset of differential receivers are used for a second type of differential signal encoding, and at least one differential receiver is shared by both the first and second sets of differential receivers.

21. The termination network for a receiver device of claim 20, wherein the first and second sets of differential receivers share at least a plurality of terminals through which differential signals are received.

22. The termination network for a receiver device of claim 20, wherein the first subset of differential receivers is used for D-PHY differential signaling and the second subset of differential receivers is used for N-factorial differential signaling.

23. The termination network for a receiver device of claim 22, wherein the N-factorial differential signaling is 4-factorial differential signaling.

24. The termination network for a receiver device of claim 22, wherein the N-factorial differential signaling is 3-factorial differential signaling.

25. The termination network for a receiver device of claim 22, wherein when using N-factorial differential signaling the termination network is configured for N-factorial low-power (LP) single ended signaling mode operation.

26. The termination network for a receiver device of claim 22, wherein when using N-factorial differential signaling the termination network is configured for N-factorial high-speed (HS) differential signaling mode operation.

* * * * *